United States Patent
Odagiri et al.

(10) Patent No.: US 6,952,494 B2
(45) Date of Patent: Oct. 4, 2005

(54) COLOR COORDINATE TRANSFORMATION TABLE GENERATION METHOD, COLOR COORDINATE TRANSFORMATION TABLE GENERATION APPARATUS, AND STORAGE MEDIUM ON WHICH A COLOR COORDINATE TRANSFORMATION TABLE GENERATION PROGRAM IS RECORDED

(75) Inventors: Junichi Odagiri, Kawasaki (JP); Nobuaki Usui, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 672 days.

(21) Appl. No.: 10/145,032

(22) Filed: May 15, 2002

(65) Prior Publication Data

US 2003/0038954 A1 Feb. 27, 2003

Related U.S. Application Data

(63) Continuation of application No. PCT/JP99/06447, filed on Nov. 18, 1999.

(51) Int. Cl.$^7$ ................................................. G06K 9/00
(52) U.S. Cl. ....................... 382/162; 382/276; 345/602; 358/1.9
(58) Field of Search ................................. 382/162, 166, 382/293, 276, 167, 233, 232, 238, 247, 244; 358/1.1, 1.9, 518, 504, 522, 523, 500; 345/600, 604, 427, 418, 581, 589, 601, 602, 590

(56) References Cited

U.S. PATENT DOCUMENTS

| 4,992,963 A | 2/1991 | Funt et al. .................. 582/162 |
| 5,149,960 A | 9/1992 | Dunne et al. ............... 250/226 |
| 5,481,380 A | 1/1996 | Bestmann ................... 358/504 |
| 5,543,940 A | 8/1996 | Sherman ..................... 358/518 |
| 6,204,939 B1 * | 3/2001 | Lin et al. ..................... 358/518 |
| 6,320,668 B1 * | 11/2001 | Kim ............................ 358/1.1 |

FOREIGN PATENT DOCUMENTS

| DE | 4305693 | 10/1993 |
| EP | 0 891 078 A2 | 1/1999 |
| JP | 7-123280 | 5/1995 |
| JP | 7-177364 | 7/1995 |
| JP | 8-4321 | 1/1996 |
| JP | 8-111784 | 4/1996 |
| JP | 9-6956 | 1/1997 |
| JP | 9-261495 | 10/1997 |

OTHER PUBLICATIONS

Hug, Po–Chieh, "Colorimetric Calibration for Scanners and Media", Proceedings of the SPIE, SPIE, Bellingham, VA, US, vol. 1448, 1991, pp. 164–174.

Haneishi, Hideaki, et al., "Colorimetric Precision in Scanner Calibration Using Matrices", Proceedings of the IS&T/SID 1995 Color Imaging Conference: Color Science, Systems and Applications, vol. 3, pp. 106–108, Scotsdale, Arizona, USA.

* cited by examiner

*Primary Examiner*—Bhavesh M. Mehta
*Assistant Examiner*—Sheela Chawan
(74) *Attorney, Agent, or Firm*—Staas & Halsey LLP

(57) ABSTRACT

The color coordinate transformation table generation method and apparatus of the invention enables substantial reduction in number of color samples required for inferring spectral characteristics by selectively measuring only usable color samples. In addition, applying a model analysis technique using spline functions or a singular value analysis technique realizes accurate inference of spectral characteristics. The color coordinate transformation table generation apparatus of the invention can generate a large number of association tables needed for constituting profiles according to a technique of generating virtual color samples or deriving color signals from a numerous sets of spectral reflectance data by using inferred spectral characteristics.

13 Claims, 18 Drawing Sheets

Fig. 5
(A)
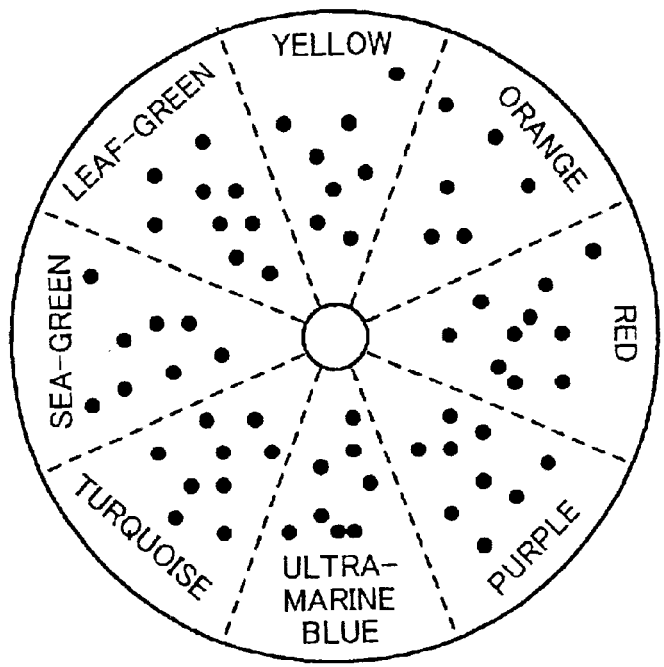
(B)
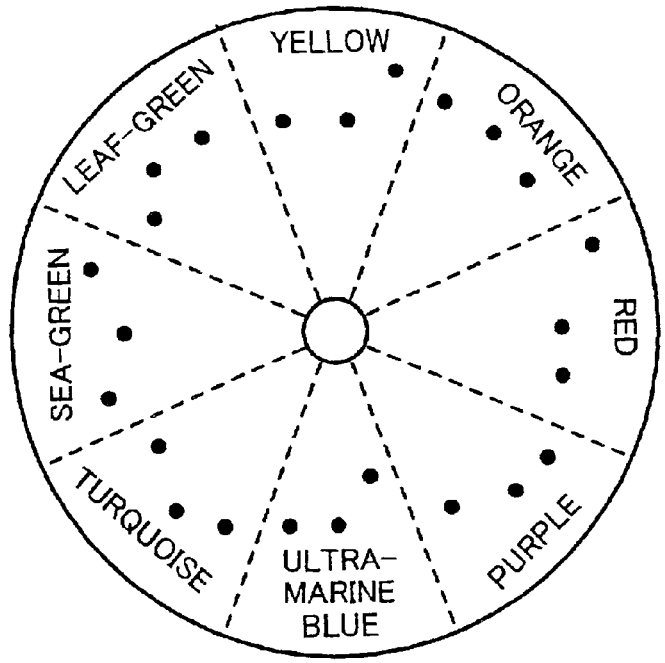

Fig. 7
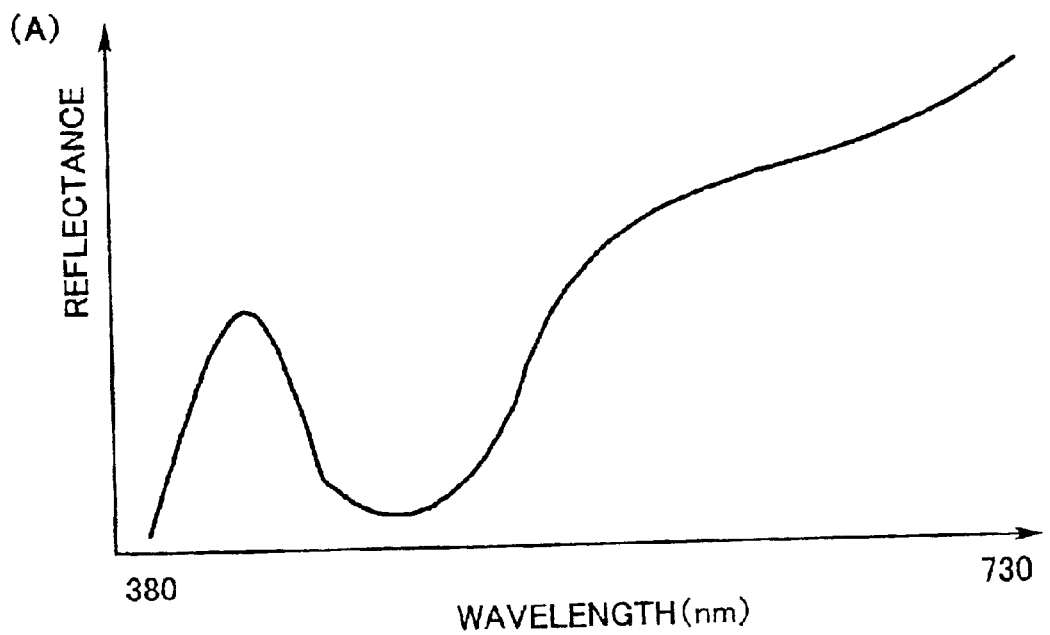
(A)
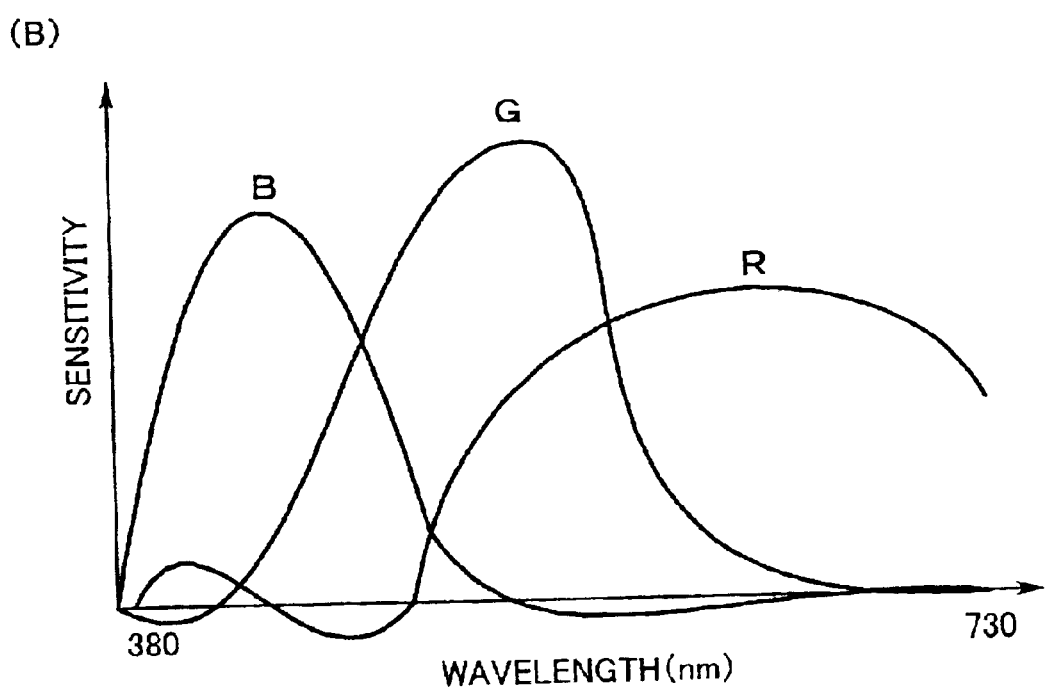
(B)

Fig. 9
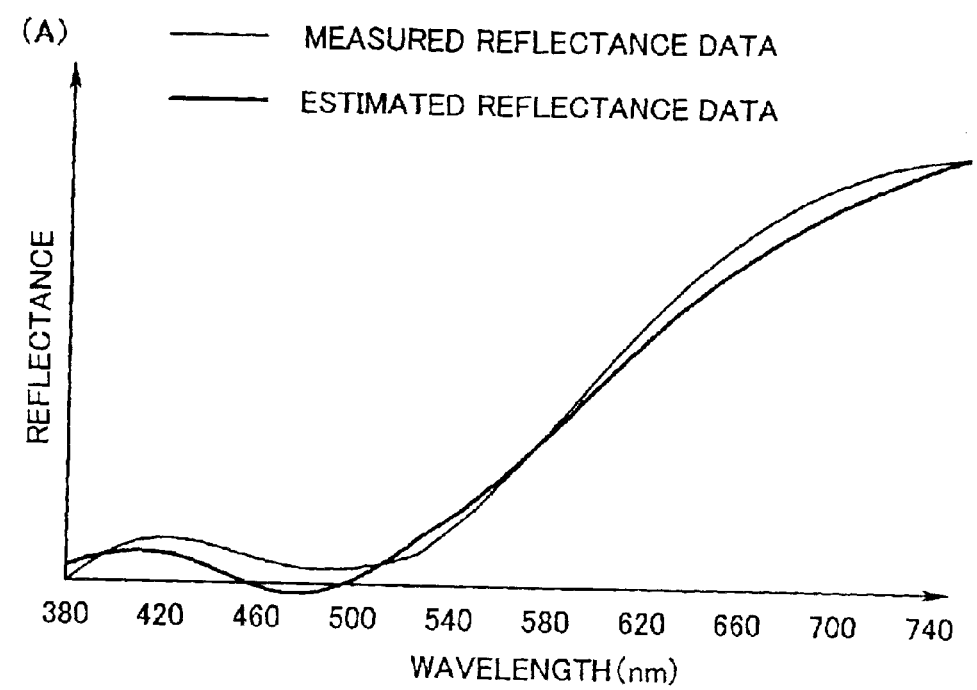
(A)
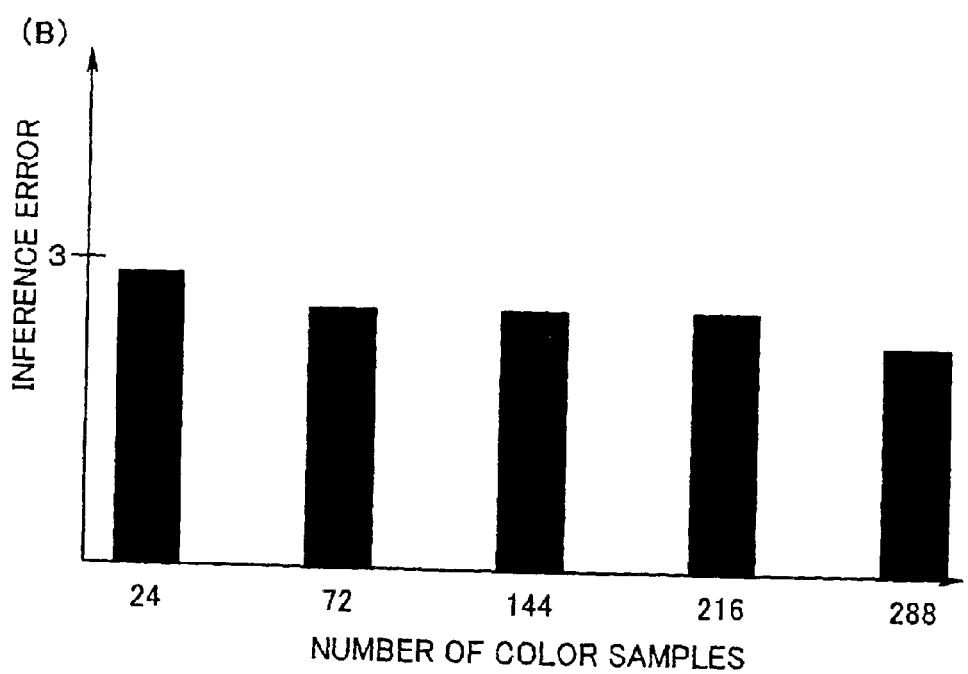
(B)

Fig. 12
(A)
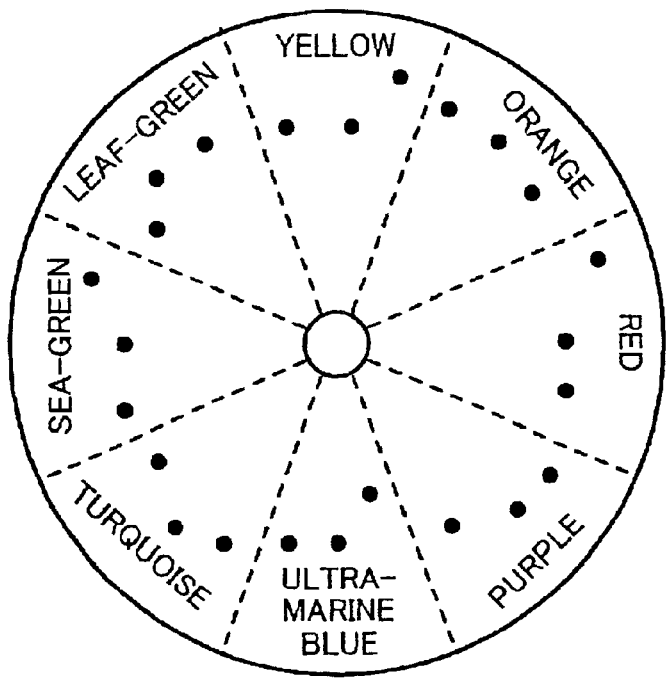
(B)
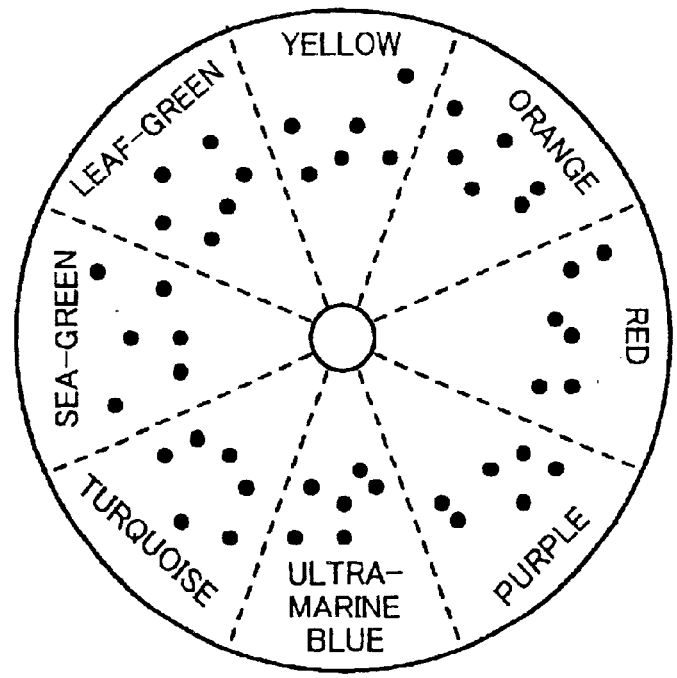

Fig. 18
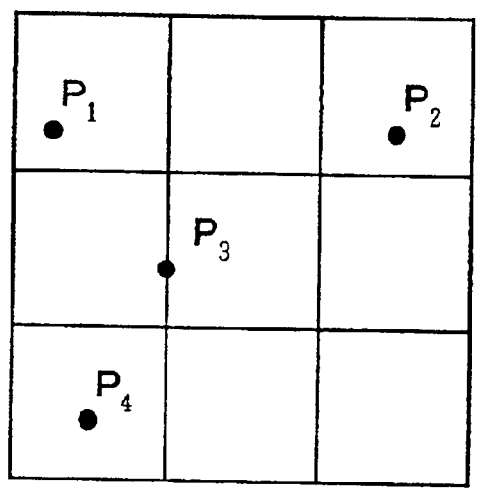
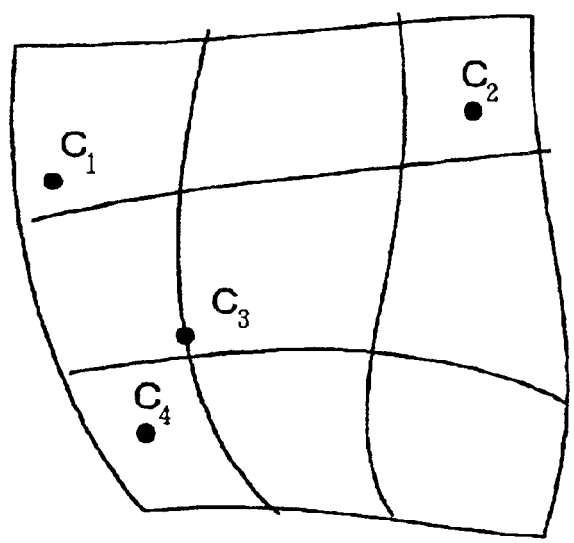

COLOR COORDINATE TRANSFORMATION TABLE GENERATION METHOD, COLOR COORDINATE TRANSFORMATION TABLE GENERATION APPARATUS, AND STORAGE MEDIUM ON WHICH A COLOR COORDINATE TRANSFORMATION TABLE GENERATION PROGRAM IS RECORDED

CROSS REFERENCE TO RELATED APPLICATION

This application is a continuation application of International Application PCT/JP99/06447, filed Nov. 18, 1999, and designating the U.S.

BACKGROUND OF THE INVENTION

1. Field of the Invention

The present invention relates to a method for generating a color coordinate transformation table that is used for transforming a color signal reflecting the characteristic of a color reading device such as an image scanner into a color signal corresponding to chromaticity coordinates in a different color space, a color coordinate transformation table generation apparatus using the above method, and a storage medium on which a related color coordinate transformation table generation program is recorded.

When an image on an original is read by a color reading device such as an image scanner, a color signal of each pixel may be converted into chromaticity coordinates that represent an equivalent color in a color space that is convenient for image processing by a computer or the like.

In this case, if a color coordinate transformation table having a function of compensating for the input characteristic of the color reading device is prepared as a color coordinate transformation table for transformation from the RGB color space to the L*a*b* color space, chromaticity coordinates representing a device-independent color of each pixel can be obtained by transformation processing using this color coordinate transformation table.

2. Description of the Related Art

International Color Consortium (ICC) has proposed that the device characteristic of a color reading device such as an image scanner or an output device such as a printer should be represented by a profile that indicates a relationship between a device-dependent color space and a device-independent color space.

The profile is an example of the above-mentioned color coordinate transformation table. For example, a profile representing the input characteristic of an image scanner is a collection of about 5,000 pairs of color signals indicating coordinates in the RGB color space and chromaticity coordinates in the L*a*b* color space.

FIG. 17 shows the configuration of an exemplary color coordinate transformation managing device.

In the color coordinate transformation managing device of FIG. 17, an input color transforming section 11 calculates chromaticity coordinates corresponding to a color signal that is input from an image scanner (hereinafter abbreviated as "scanner") 17 based on a scanner profile that is stored in a scanner profile storing section 12, and stores the obtained chromaticity coordinates in a chromaticity coordinate storing section 13 so that they will be used for processing in an image processing section 14.

On the other hand, an output color transforming section 15 transforms chromaticity coordinates that are stored in the chromaticity coordinate storing section 13 into a color signal using a display profile that is stored in a display profile storing section 16 so that it will be used for display processing in a CRT display device (abbreviated as "CRT" in FIG. 17) 18.

By causing the above color coordinate transformation managing device to perform color transform processing using a profile suitable for an input device and a profile suitable for an output device, colors of an original can be reproduced faithfully on the CRT display device 18, irrespective of the input characteristic of the scanner 17 and the output characteristic of the CRT display device 18.

Conventionally, a scanner profile and a display profile of the above kind are produced according to the following procedure.

For example, to produce a scanner profile, first, the standard color chart that is prescribed by ISO is read by a subject scanner, whereby color signals $P_1$-$P_n$ are obtained each of which indicates intensity of components corresponding to the three primary colors that are included in reflection light coming from a number n of regions on the chart.

Then, sets $C_1$-$C_n$ of chromaticity coordinates indicating device-independent colors of respective regions on the standard color chart are measured by a calorimeter or the like. As shown in FIG. 18, each set of chromaticity coordinates thus measured is correlated with a color signal corresponding to the same region. In this manner, a basic association table as a base of a profile is obtained. The basic association table represents relationships between the color signals $P_1$-$P_n$ and the sets $C_1$-$C_n$ of chromaticity coordinates, respectively.

Then, interpolation processing is performed based on this basic association table, whereby another association table, which represents relationships between color signals locating at uniformly distributed grid points in the RGB color space and sets of chromaticity coordinates of device-independent colors corresponding to the sets of color signals in the L*a*b* color space, is generated. A profile is completed in this manner.

Conventionally, every time a scanner profile is to be produced, an association table having 5000 entries is generated by performing measurements of the above kind on the 288 colors on the standard color chart and performing interpolation processing on a resulting association table of 288 pairs.

Among the techniques relating to the interpolation processing is a technique disclosed in Japanese Patent Laid-Open No. 307872/1995 in which linear interpolation processing is performed on a basic association table using obtained pairs of measured values to generate an association table having a large number of entries.

Another method has been proposed in which a spectral characteristic of a scanner is inferred based on a basic association table of measured values and a relationship as a profile is obtained by using the inferred spectral characteristic.

Among the various techniques of inferring an input characteristic of a color reading device such as a scanner, is a technique disclosed in Japanese Patent Laid-Open No. 46252/1994 in which a spectral characteristic is inferred by solving, using the least-squares method, a simultaneous equation that has been derived from measured values.

However, measuring, with a colorimeter, colors of a lot of color samples as regions of the standard color chart and also reading these color samples with a subject color reading device are still required for producing profiles by performing interpolation on a basic association table, and according to a spectral characteristic inferred based on measurement results.

The above operations require much manpower, and accounts for a large part of a profile producing operation. Besides, these manpower consuming operations are necessary every time a profile is produced.

SUMMARY OF THE INVENTION

An object of the present invention is to provide a technique of generating, based on measurement results of a sample set consisting of a small number of color samples, a color coordinate transformation table indicating a relationship between color signals scattered in a desired distribution in a color space dependent on the color reading device and sets of chromaticity coordinates indicating true colors to be represented by the color signals in a desired color space, and to thereby greatly reduce the operational amounts of measuring spectral reflectance values of color samples and of reading color samples with a scanner as a subject of evaluation, and further to substantially abate the entire workload of generating a color coordinate transformation table.

Another object of the invention is to provide a technique of extracting a sample set consisting of useful color samples from a large number of color samples, to thereby increase the accuracy of inferring spectral characteristics of a color reading device.

Still another object of the invention is to provide a technique of accurately inferring spectral characteristics of a color reading device based on measurement data of an extracted sample set, to thereby maintain the accuracy of inferred spectral characteristics even with reduction in the number of color samples as subjects of measurement, and to increase the accuracy of a color coordinate transformation table finally obtained.

A further object of the invention is to provide a technique of generating a color coordinate transformation table indicating a relationship between color signals and sets of chromaticity coordinates, by using inferred spectral characteristics, to thereby obtain a very accurate color coordinate transformation table.

The above objects are attained by a color coordinate transformation table generation method comprising the steps of selecting a plurality of color samples suitable for inferring spectral characteristics of a color reading device as a subject of evaluation, from a sufficiently large number of color samples; obtaining sets of spectral reflectance data by measuring the respective selected color samples at predetermined wavelength intervals; accepting color signals indicating colors of the respective selected color samples in a device-dependent color space, from the color reading device as a subject of evaluation; inferring spectral characteristics of the color reading device when the color reading device reads a color of an original based on the sets of spectral reflectance data and the accepted color signals; and generating, according to the inferred spectral characteristics, a color coordinate transformation table indicating a relationship between color signals distributed in the device-dependent color space and sets of chromaticity coordinates indicating, in another color space, true colors to be represented by the color signals, respectively.

The above objects are attained by a color coordinate transformation table generation apparatus comprising a selecting unit for selecting a sample set consisting of a plurality of color samples suitable for inferring spectral characteristics of a color reading device as a subject of evaluation from a sufficiently large number of color samples; a measuring unit for obtaining sets of spectral reflectance data by measuring each of the selected color samples constituting the sample set at predetermined wavelength intervals; an accepting unit for accepting color signals indicating colors of the respective selected color samples constituting the sample set in a device-dependent color space, from the color reading device as a subject of evaluation; an inferring unit for inferring spectral characteristics of the color reading device when the color reading device reads a color of an original based on the sets of spectral reflectance data and the accepted color signals; and a table generating unit for generating, according to the inferred spectral characteristics, a color coordinate transformation table indicating a relationship between color signals distributed in the device-dependent color space and sets of chromaticity coordinates indicating, in another color space, true colors to be represented by the color signals, respectively.

In the above color coordinate transformation table generation method or apparatus according to the invention, generating a desired color coordinate transformation table based on sets of spectral reflectance data and color signals obtained by measuring color samples selected depending on their usability results in substantial reduction in operational amounts of measurement of colors with a colorimeter and also of reading color samples with a color reading device.

Forming a sample set by performing selecting operation of color samples in the above-described manner realizes generation of usable sample sets irrespective of the time of generating a color coordinate transformation table. Therefore, selecting such a sample set for a color reading device to be evaluated just once, and measuring the same sample set enable generation of any number of color coordinate transformation tables.

One of the above objects is attained by a color coordinate transformation table generation apparatus wherein the selecting unit comprises a simple extracting unit for extracting a plurality of color samples from the sufficiently large number of color samples; an evaluation index calculating unit for calculating, for a sample set consisting of the extracted color samples, a value of an evaluation index indicating mutual independence of components corresponding to respective values of each spectral characteristic to be inferred; an output unit for outputting the sample set as a selection result if the value of the evaluation index indicates that the color samples constituting the sample set are sufficiently independent; and a repeat unit for instructing the simple extracting unit to extract a new sample set if the value of the evaluation index indicates that the color samples constituting the sample are not sufficiently independent.

In the color coordinate transformation table generation apparatus having the above selecting unit, the color sample set being a collection of color samples can be optimized by the repeat unit's controlling the extracting operation of the simple extracting unit in accordance with the evaluation index value obtained by the evaluation index calculating unit. Therefore, it is possible to select a sample set consisting of color samples having a suitable feature so as to use the sample set for processing in the downstream units.

One of the above objects is attained by a color coordinate transformation table generation apparatus, wherein the selecting unit comprises a hue evaluating unit for evaluating hue of each of the sufficiently large number of color samples; and a hue base extracting unit for extracting color samples whose evaluation values relating to hue are uniformly distributed based on evaluation results of the hue evaluating unit.

In the color coordinate transformation table generation apparatus having the above selecting unit, selecting color samples based on their hue values makes it possible to prepare a sample set consisting of color samples which are measurement data suitable for inferring spectral characteristics, which improves the accuracy of inferring spectral characteristics. This is because it is considered that sets of spectral reflectance data of a thus-obtained sample set have much different features from each other and hence their components, which represent respective values of each spectral characteristic of the color reading device, are expected to be very independent of each other.

One of the above objects is attained by a color coordinate transformation table generation apparatus wherein the selecting unit comprises a saturation evaluating unit for evaluating saturation of each of the sufficiently large number of color samples; and a saturation base extracting unit for extracting color samples whose saturation has been judged high by the saturation evaluating unit.

In the color coordinate transformation table generation apparatus having the above selecting unit, selecting color samples based on their saturation values makes it possible to prepare a sample set consisting of color samples which are measurement data suitable for inferring spectral characteristics, which improves the accuracy of inferring spectral characteristics. This is because it is considered that sets of spectral reflectance data of thus-obtained sample sets eminently represent their respective features and hence their components, which represent respective values of each spectral characteristic of the color reading device, are expected to be very independent of each other.

The above objects are attained by a color coordinate transformation table generation apparatus wherein the inferring unit comprises an equation generating unit for generating simultaneous equations that relate a color signal to a set of spectral reflectance data of a color sample corresponding to the color signal; a transforming unit for transforming the simultaneous equations using a model that expresses each spectral characteristic by a linear combination of a plurality of primary spline functions; and a weight analysis unit for determining spectral characteristics by analyzing the transformed simultaneous equations and calculating weights for the respective spline functions.

In the color coordinate transformation table generation apparatus having the above inferring unit, it is possible to accurately estimate spectral characteristic values at respective sampling wavelengths where spectral reflectance values are measured, based on sets of spectral reflectance data and color signals that have been obtained for a number of color samples smaller than the number of sampling wavelengths. This is because the number of weights to be calculated by the weight analysis unit depends on the number of spline functions used in a model that expresses spectral characteristics, and the number of spline functions can be determined independently of the number of sampling wavelengths where spectral reflectance values are measured.

The above objects are attained by a color coordinate transformation table generation apparatus wherein the inferring unit comprises an equation generating unit for generating simultaneous equations that relate a color signal to a set of spectral reflectance data of a color sample corresponding to the color signal; a singular value analyzing unit for calculating weights corresponding to respective proper principal component vectors by performing a singular value analysis on the simultaneous equations; and a characteristic calculating unit for calculating spectral characteristics based on the calculated weights and the principal component vectors.

In the color coordinate transformation table generation apparatus having the above inferring unit, using the singular value analysis technique for inferring spectral characteristics enables accurate estimation of spectral characteristic values at respective sampling wavelengths where spectral reflectance values are measured, based on sets of spectral reflectance data and color signals that have been obtained for a number of color samples smaller than the number of sampling wavelengths.

The above objects are attained by a color coordinate transformation table generation apparatus wherein the inferring unit comprises an equation generating unit for generating simultaneous equations that relate a color signal to a set of spectral reflectance data of a color sample corresponding to the color signal; a singular value analyzing unit for calculating weights corresponding to respective proper principal component vectors by performing a singular value analysis on the simultaneous equations; a vector selecting unit for selecting only useful principal component vectors based on the weights calculated by the singular value analyzing unit; and a characteristic calculating unit for calculating spectral characteristics based on the selected useful principal component vectors and weights corresponding thereto.

In the color coordinate transformation table generation apparatus having the above inferring unit, the vector selecting unit's selecting only useful principal component vectors results in suppressing influence of noise that is included in the sets of spectral reflectance data and the color signals. This makes it possible to infer spectral characteristics with high accuracy.

The above objects are attained by a color coordinate transformation table generation apparatus wherein the table generating unit comprises a color signal generating unit for generating, as elements of a color coordinate transformation table, color signals scattered in a desired distribution in the device-dependent color space; a sample preparing unit for calculating, for each of the generated color signals, sets of spectral reflectance data corresponding to virtual color samples which are to provide the color signals, respectively, by using the spectral characteristics inferred by the inferring unit; and a chromaticity calculating unit for calculating, as elements of the color coordinate transformation table, sets of chromaticity coordinates in a desired color space based on the sets of spectral reflectance data corresponding to the respective virtual color samples.

In the color coordinate transformation table generation apparatus having the above table generating unit, it is possible to calculate sets of spectral reflectance data of a set of virtual color samples, which are assumed for respective desired color signals, by using spectral characteristics of the color reading device, and to further employ the calculated data for calculation of the chromaticity coordinate. This enables determining, with approximately uniform accuracy, a relationship between color signals scattered in a desired distribution and sets of chromaticity coordinates in a desired color space.

The above objects are attained by a color coordinate transformation table generation apparatus wherein the table generating unit comprises a color signal generating unit for generating, as elements of a color coordinate transformation table, color signals scattered in a desired distribution in the device-dependent color space; a sample preparing unit for calculating, for each of the generated color signals, sets of spectral reflectance data corresponding to virtual color samples to provide the color signals, respectively, by using the spectral characteristics inferred by the inferring unit, the sample preparing unit comprising a principal component accepting unit for accepting principal component vectors that determine a set of spectral reflectance data of an arbitrary color sample, a weight calculating unit for calculating, based on the accepted principal component vectors and the spectral characteristics, weights to be applied to the principal component vectors to provide sets of spectral reflectance data of the virtual color samples corresponding to the respective color signals scattered in the predetermined distribution; a component base reflectance calculating unit for calculating sets of spectral reflectance data of the respective virtual color samples based on the calculated weights and the principal component vectors; and a reflectance correcting unit for correcting negative values included in the sets of spectral reflectance data to zero; and a chromaticity calculating unit for calculating, as elements of the color coordinate transformation table, sets of chromaticity coordinates in a desired color space based on the sets of spectral reflectance data corresponding to the respective virtual color samples.

In the color coordinate transformation table generation apparatus having the table generating unit that is provided with the above sample preparing unit, principal component vectors, or determining factors of a set of reflectance values of a color sample are employed to replace the processing of calculating a set of spectral reflectance data corresponding to a virtual color sample based on an arbitrary color signal and spectral characteristics, with a simple matrix operation. Further, correcting, in the above-described manner, a set of spectral reflectance data obtained by this matrix operation makes it possible to eliminate influence of noise and obtain realistic chromaticity coordinates.

The above objects are attained by a color coordinate transformation table generation apparatus wherein the table generating unit comprises: a color signal generating unit for generating, as elements of a color coordinate transformation table, color signals to be scattered in a desired distribution in the device-dependent color space; a sample preparing unit for calculating, for each of the generated color signals, sets of spectral reflectance data corresponding to virtual color samples to provide the color signals, respectively, by using the spectral characteristics inferred by the inferring unit, the sample preparing unit comprising a model generating unit for generating a model equation that relates an arbitrary color signal to a set of spectral reflectance data of a virtual color sample that provides the arbitrary color signal, an inverse calculating unit for calculating a pseudo-inverse of a matrix representing the spectral characteristics of the color reading device in the model equation, a model base reflectance calculating unit for calculating sets of spectral reflectance data of the respective virtual color samples based on the color signals scattered in the desired distribution and the calculated pseudo-inverse, and a reflectance correcting unit for correcting negative values included in the sets of spectral reflectance data to zero; and a chromaticity calculating unit for calculating, as elements of the color coordinate transformation table, sets of chromaticity coordinates in a desired color space based on the sets of spectral reflectance data corresponding to the respective virtual color samples.

In the color coordinate transformation table generation apparatus having the table generating unit that is provided with the above sample preparing unit, since a pseudo-inverse has been determined in the above-mentioned model equation, sets of spectral reflectance data corresponding to respective virtual color samples can be calculated by the model base reflectance calculating unit's calculating the products of color signals scattered in a desired distribution and the pseudo-inverse. Further, correcting, in the above-described manner, the sets of spectral reflectance data obtained by this matrix operations makes it possible to eliminate influence of noise and obtain realistic chromaticity coordinates.

The above objects are attained by a color coordinate transformation table generation apparatus wherein the table generating unit comprises a reflectance accepting unit for accepting sets of spectral reflectance data of a sufficiently large number of color samples having different colors; a color signal calculating unit for calculating color signals as expected input data from the color reading device based on the sets of spectral reflectance data and the spectral characteristics inferred by the inferring unit; a color signal correcting unit for correcting negative values included in the calculated color signals to zero; a chromaticity coordinate calculating unit for calculating sets of chromaticity coordinates in a desired color space that correspond to the respective sets of spectral reflectance data; and a relationship determining unit for determining a relationship between color signals scattered in the desired distribution in the device-dependent color space and sets of chromaticity coordinates indicating, in the desired color space, true colors expected to be represented by the color signals, respectively, based on relationships between the calculated sets of chromaticity coordinates and the corrected color signals.

In the color coordinate transformation table generation apparatus having the above table generating unit, color signals, which are equivalent to ones as would be obtained by reading the above-mentioned large number of color samples with the color reading device, are obtainable based on accepted sets of spectral reflectance data and inferred spectral characteristics. This is because the accepted sets of spectral reflectance data are prepared correspondingly to each of a large number of color samples. Correcting the obtained color signals in the above-described manner makes it possible to eliminate influence of noise and obtain realistic color signals. Performing Interpolation processing by a known technique after obtaining an association table including sufficient number of elements realizes obtaining, with high accuracy, sets of chromaticity coordinates corresponding to, for example, color signals distributed in grid form in a color space that depends on the color reading device.

The above objects are attained by causing a computer to read, from a storage medium on which a program is recorded, and execute the program to execute a selecting step of selecting a sample set consisting of a plurality of color samples for inferring spectral characteristics of a color reading device as a subject of evaluation, from a sufficiently large number of color samples; a measuring step of obtaining sets of spectral reflectance data by measuring each of the selected color samples constituting the sample set at predetermined wavelength intervals; an accepting step of accepting color signals indicating colors of the respective selected color samples constituting the sample set in a device-dependent color space, from the color reading device as a subject of evaluation; an inferring step of inferring spectral characteristics of the color reading device when the color reading device reads a color of an original based on the sets of spectral reflectance data and the accepted color signals; and a table generating step of generating, according to the inferred spectral characteristics, a color coordinate transformation table indicating a relationship between color signals distributed in the device-dependent color space and sets of chromaticity coordinates indicating, in another color space, true colors expected to be represented by the color signals, respectively.

With the storage medium on which the color coordinate transformation table generation program of the invention is stored, the program causes a computer to execute the above steps and thereby operate according to the color coordinate transformation table generation method of the invention, whereby spectral characteristics of the color reading device can be inferred with accuracy based on measurement results of a sample set consisting of a small number of color samples to generate a proper color coordinate transformation table.

The color coordinate transformation table generation method, the color coordinate transformation table generation apparatus of the invention, and the storage medium on which the color coordinate transformation table generation program of the invention is stored can be applied to operations of generating not only profiles of a scanner but also color coordinate transformation tables of other various color reading devices.

Further, it is possible to construct a color coordinate transformation table generation apparatus by freely combining major units for extracting a sample set consisting of useful color samples, inferring spectral characteristics, or generating a color coordinate transformation table. The above-mentioned main objects can be attained by any of the combinations.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 5A and 5B are charts illustrating an operation of selecting color samples;

FIGS. 7A and 7B are an example of spectral reflectance data of a color sample and an example of spectral characteristics, respectively;

FIG. 9A is a graph showing how spectral reflectance data are corrected;

FIG. 9B is a graph showing a relationship between the number of color samples and the error in inferring spectral characteristics;

FIGS. 12A and 12B are charts illustrating an operation of selecting color samples;

FIG. 18 shows a relationship between the RGB color space and the L*a*b* color space.

DESCRIPTION OF THE PREFERRED EMBODIMENTS

[Principles]

First, the principles of a color coordinate transformation table generation method and a color coordinate transformation table generation apparatus according to the present invention, and a storage medium on which a related color coordinate transformation table-generation program is recorded will be described below.

Figure 1:
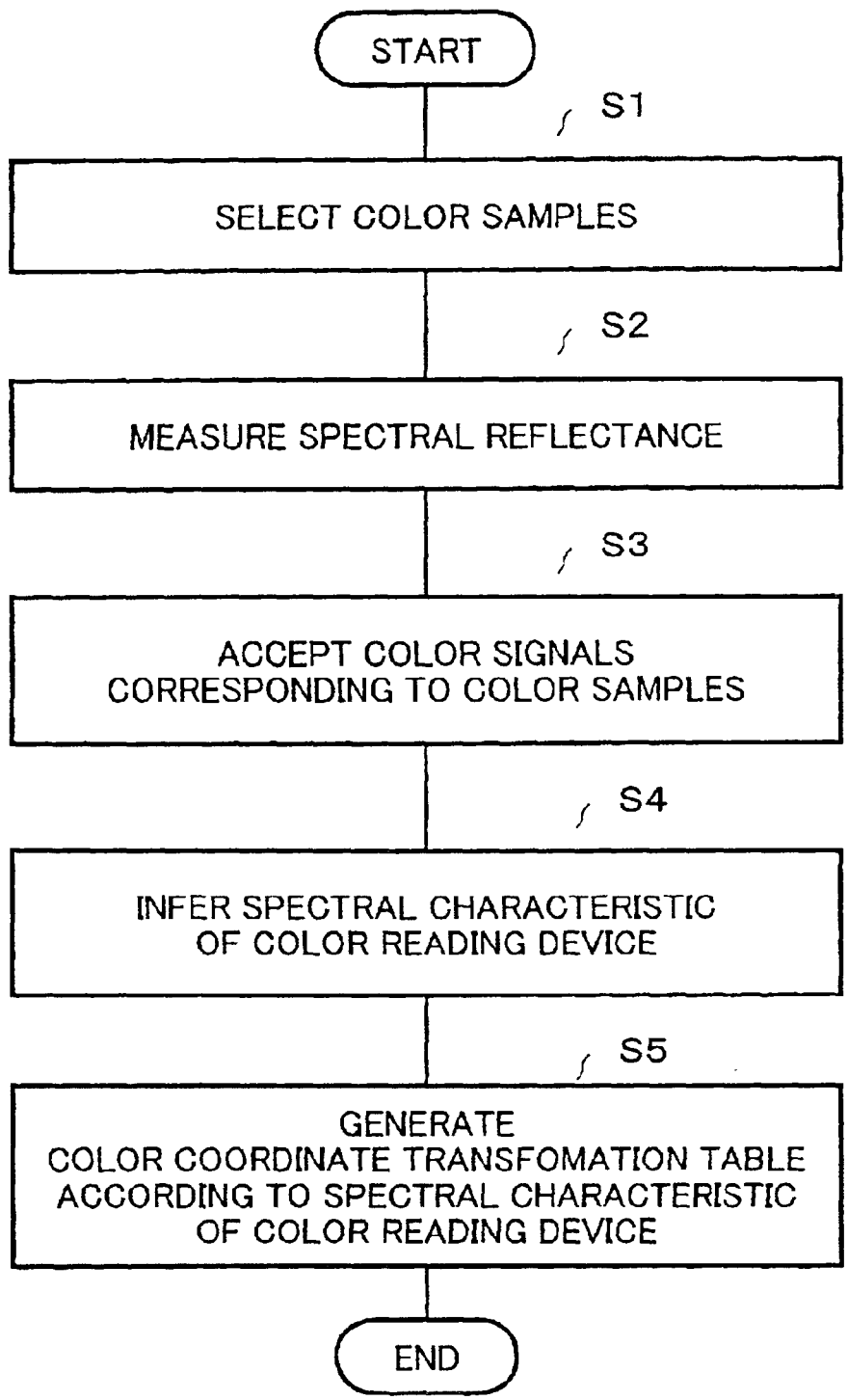
FIG. 1 is a flowchart showing the principle of a color coordinate transformation table generation method according to the present invention.

FIG. 1 shows the principle of a color coordinate transformation table generation method according to the invention.

The color coordinate transformation table generation method shown in FIG. 1 comprises a selecting step, a measuring step, an accepting step, an inferring step, and a table generating step. It is also possible to record, in a storage medium, a program for causing a computer to execute the above selecting step, measuring step, accepting step, inferring step, and table generating step.

The principle of the color coordinate transformation table generation method according to the invention is as follows.

The selecting step selects a plurality of color samples suitable for inferring spectral characteristics of a color reading device as a subject of evaluation, from a sufficiently large number of color samples. The measuring step obtains sets of spectral reflectance data by measuring the respective selected color samples at predetermined wavelength intervals. The accepting step accepts color signals indicating colors of the respective selected color samples in a device-dependent color space. The inferring step infers spectral characteristics of the color reading device when the color reading device reads a color of an original based on the sets of spectral reflectance data and the accepted color signals. The table generating step generates, according to the inferred spectral characteristics, a color coordinate transformation table indicating a relationship between color signals that are distributed in the device-dependent color space and sets of chromaticity coordinates indicating, in another color space, true colors to be represented by the color signals, respectively.

The above color coordinate transformation table generation method operates in the following manner.

The measuring step obtains sets of spectral reflectance data by measuring, at predetermined wavelength intervals, respective useful color samples selected by the selecting step. The accepting step accepts color signals indicating colors of the respective color samples by reading the color samples with the color reading device. The inferring step infers spectral characteristics of the color reading device based on the sets of spectral reflectance data and the color signals obtained by the above steps. The table generating step generates, according to the inferred spectral characteristics, a color coordinate transformation table to be used for transforming a color signal to be input from the color reading device into chromaticity coordinates indicating true colors of an original.

Figure 2:
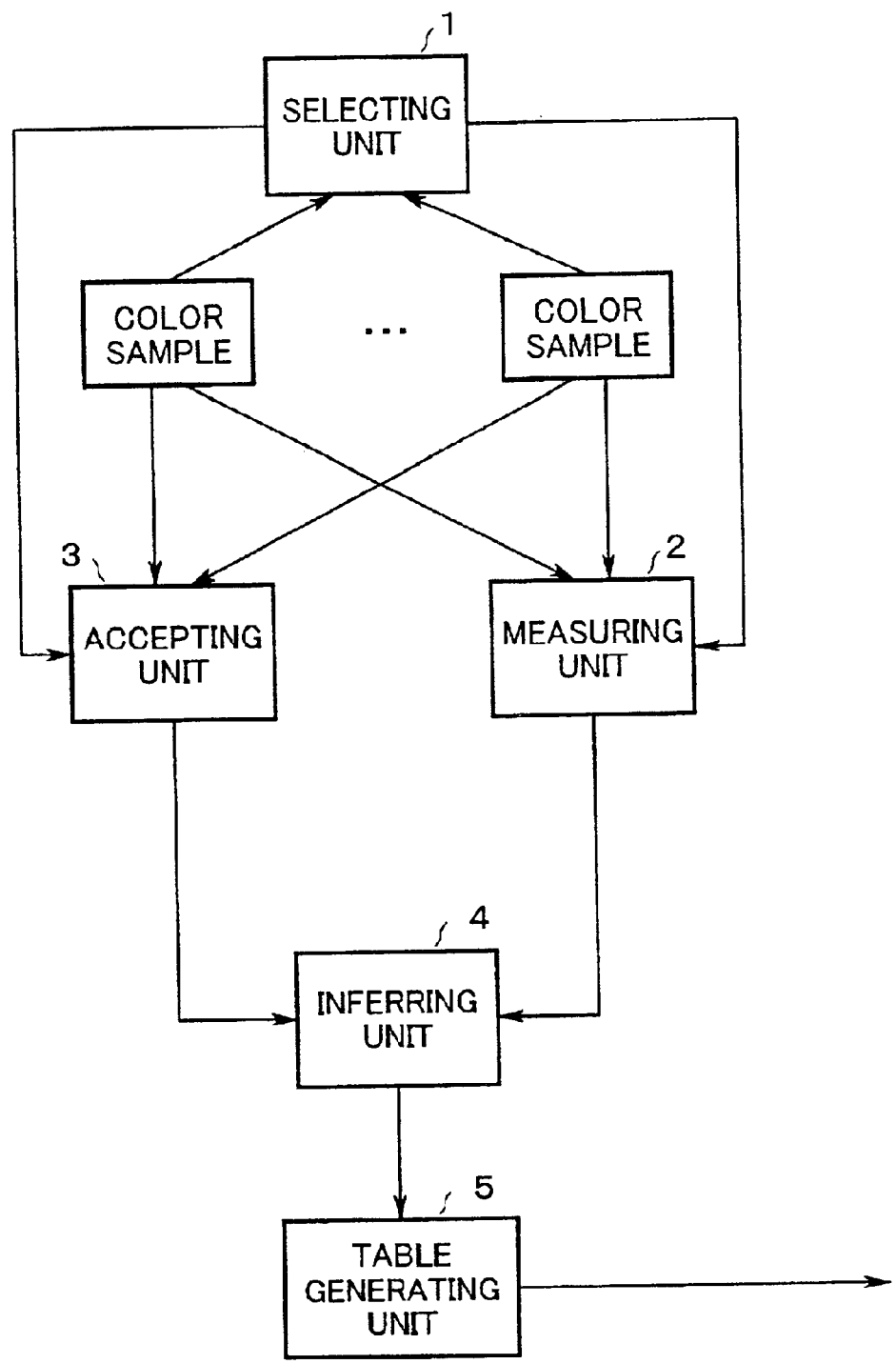
FIG. 2 is a block diagram showing the principle of a color coordinate transformation table generation apparatus according to the invention.

FIG. 2 is a block diagram showing the principle of a color coordinate transformation table generation apparatus according to the invention.

The color coordinate transformation table generation apparatus shown in FIG. 2 is composed of a selecting unit 1, a measuring unit 2, an accepting unit 3, an inferring unit 4, and a table generating unit 5.

The principle of the color coordinate transformation table generation apparatus according to the invention is as follows.

The selecting unit 1 selects a sample set consisting of a plurality of color samples suitable for inferring spectral characteristics of a color reading device as a subject of evaluation, from a sufficiently large number of color samples. The measuring unit 2 obtains sets of spectral reflectance data by measuring the respective color samples constituting the sample set according to selection result of the selecting unit 1 at predetermined wavelength intervals. The accepting unit 3 accepts color signals indicating colors of the respective selected color samples constituting the sample set according to selection result of the selecting unit 1 in a device-dependent color space. The inferring unit 4 infers spectral characteristics of the color reading device when the color reading device reads a color of an original based on the sets of spectral reflectance data and the accepted color signals. The table generating unit 5 generates; according to the inferred spectral characteristics, a color coordinate transformation table indicating a relationship between color signals that are distributed in the device-dependent color space and sets of chromaticity coordinates indicating, in another color space, true colors to be represented by the color signals, respectively.

The color coordinate transformation table generation apparatus having the above configuration operates in the following manner.

The measuring unit 2 obtains sets of spectral reflectance data by measuring, at predetermined wavelength intervals, respective suitable color samples selected by the selecting unit 1. The accepting unit 3 accepts color signals obtained by reading the selected color samples with the color reading device. The inferring unit 4 infers spectral characteristics of the color reading device based on the sets of spectral reflectance data and the color signals that have been obtained by the measuring unit 2 and the accepting unit 3, respectively. The table generating unit 5 generates, according to the inferred spectral characteristics, a color coordinate transformation table to be used for transforming a color signal to be input from the color reading device into chromaticity coordinates indicating true colors of an original.

The selecting unit 1 provided in the color coordinate transformation table generation apparatus of FIG. 2 may comprise a simple extracting unit, an evaluation index calculating unit, an output unit, and a repeat unit.

The principle of this selecting unit 1 is as follows.

The simple extracting unit extracts a predetermined number of color samples from the sufficiently large number of color samples. The evaluation index calculating unit calculates, for a sample set consisting of the extracted color samples, a value of an evaluation index indicating mutual independence of components corresponding to respective values of each spectral characteristic to be inferred. The output unit outputs the sample set as a selection result if the value of the evaluation index indicates that the color samples constituting the sample set are sufficiently independent. The repeat unit instructs the simple extracting unit to extract a new sample set if the value of the evaluation index indicates that the color samples constituting the sample set are not sufficiently independent.

The selecting unit 1 having the above configuration operates in the following manner.

The evaluation index calculating unit calculates a value of a proper evaluation index for a sample set obtained by the simple extracting unit. The repeat unit instructs the simple extracting unit to extract a new sample set if the value of the evaluation index indicates that the color samples constituting the sample set are not sufficiently independent. If the value of the evaluation index indicates that the color samples are sufficiently independent, the output unit outputs the sample set so that it will be used for processing in the measuring unit 2 and the accepting unit 3.

The selecting unit 1 provided in the color coordinate transformation table generation apparatus of FIG. 2 may comprise a hue evaluating unit and a hue base extracting unit.

The principle of this selecting unit 1 is as follows.

The hue evaluating unit evaluates hue of each of the sufficiently large number of color samples. The hue base extracting unit extracts color samples whose evaluation values relating to hue are distributed uniformly, based on evaluation results of the hue evaluating unit.

The selecting unit 1 having the above configuration operates in the following manner.

The hue base extracting unit prepares, for example, a sample set consisting of color samples distributed uniformly over the entire range of a hue circle based on evaluation results of the hue evaluating unit so that the sample set will be used for processing in the measuring unit 2 and the accepting unit 3.

The selecting unit 1 provided in the color coordinate transformation table generation apparatus of FIG. 2 may comprise a saturation evaluating unit and a saturation base extracting unit.

The principle of this selecting unit 1 is as follows.

The saturation evaluating unit evaluates saturation of each of the sufficiently large number of color samples. The saturation base extracting unit extracts color samples whose saturation has been judged high by the saturation evaluating unit.

The selecting unit 1 having the above configuration operates in the following manner.

The saturation base extracting unit prepares a sample set consisting of color samples having high saturation based on evaluation results of the saturation evaluating unit so that the sample set will be used for processing in the measuring unit 2 and the accepting unit 3.

The inferring unit 4 provided in the color coordinate transformation table generation apparatus of FIG. 2 may comprise an equation generating unit, a transforming unit, and a weight analysis unit.

The principle of this inferring unit 4 is as follows.

The equation generating unit generates simultaneous equations that relate a color signal to a set of spectral reflectance data of a color sample corresponding to the color signal. The transforming unit transforms the simultaneous equations using a model that expresses each spectral characteristic by a linear combination of a plurality of primary spline functions. The weight analysis unit determines spectral characteristics by analyzing the transformed simultaneous equations and calculating weights for the respective spline functions.

The inferring unit 4 having the above configuration operates in the following manner.

The transforming unit transforms simultaneous equations generated by the equation generating unit using a model that expresses each spectral characteristic by a linear combination of a plurality of primary spline functions. By analyzing the transformed simultaneous equations, the weight analysis unit calculates weights for the respective spline functions used in modeling each spectral characteristic.

The inferring unit 4 provided in the color coordinate transformation table generation apparatus of FIG. 2 may comprise an equation generating unit; a singular value analyzing unit, and a characteristic calculating unit.

The principle of this inferring unit 4 is as follows.

The equation generating unit generates simultaneous equations that relate a color signal to a set of spectral reflectance data of a color sample corresponding to the color signal. The singular value analyzing unit calculates weights corresponding to respective proper principal component vectors by performing a singular value analysis technique on the simultaneous equations. The characteristic calculating unit calculates spectral characteristics based on the calculated weights and the principal component vectors.

The inferring unit 4 having the above configuration operates in the following manner.

The singular value analyzing unit calculates weights corresponding to respective proper principal component vectors by performing a singular value analysis on simultaneous equations generated by the equation generating unit. The characteristic calculating unit calculates spectral characteristics based on the calculated weights and the principal component vectors, and outputs the calculated spectral characteristics as an inference result.

The inferring unit 4 provided in the color coordinate transformation table generation apparatus of FIG. 2 may comprise an equation generating unit, a singular value analyzing unit, a characteristic calculating unit, and a vector selecting unit.

The principle of this inferring unit 4 is as follows.

The equation generating unit generates simultaneous equations that relate a color signal to a set of spectral reflectance data of a color sample corresponding to the color signal. The singular value analyzing unit calculates weights corresponding to respective proper principal component vectors by performing a singular value analysis technique on the simultaneous equations. The vector selecting unit selects only useful principal component vectors based on the weights calculated by the singular value analyzing unit. The characteristic calculating unit calculates spectral characteristics based on the selected useful principal component vectors and weights corresponding thereto.

The inferring unit 4 having the above configuration operates in the following manner.

The singular value analyzing unit calculates weights corresponding to respective proper principal component vectors by performing a singular value analysis on simultaneous equations generated by the equation generating unit. For example, the vector selecting unit selects, as useful principal component vectors, principle component vectors given weights greater than or equal to a predetermined value, from the above principal component vectors.

The characteristic calculating unit calculates spectral characteristics based on the selected useful principal component vectors and weights corresponding thereto, and outputs the calculated spectral characteristics as an inference result.

The table generating unit 5 provided in the color coordinate transformation table generation apparatus of FIG. 2 may comprise a color signal generating unit, a sample preparing unit, and a chromaticity calculating unit.

The principle of this table generating unit 5 is as follows.

The color signal generating unit generates, as elements of a color coordinate transformation table, color signals scattered in desired distribution in the device-dependent color space. The sample preparing unit calculates, for the respective color signals by the color signal generating unit, sets of spectral reflectance data corresponding to virtual color samples to provide the color signals, respectively, by using the spectral characteristics that have been inferred by the inferring unit 4. The chromaticity calculating unit calculates, as elements of the color coordinate transformation table corresponding to the respective color signals, sets of chromaticity coordinates in a desired color space based on the sets of spectral reflectance data corresponding to the respective virtual color samples.

The table generating unit 5 having the above configuration operates in the following manner.

The color signal generating unit generates desired color signals. The sample preparing unit calculates sets of spectral reflectance data corresponding to color samples which are expected to provide the color signals, respectively. As a result, sets of spectral reflectance data that are equivalent to measured data as would be obtained by the measuring unit 2 are generated for respective virtual color samples that provides color signals which are expected to be scattered in a desired distribution in a device-dependent color space, for example. A color coordinate transformation table is generated by correlating sets of chromaticity coordinates calculated by the chromaticity calculating unit based on the sets of spectral reflectance data with the color signals generated by the color signal generating unit.

The table generating unit 5 provided in the color coordinate transformation table generation apparatus of FIG. 2 may comprise the same units as the preceding table generating unit 5 does and the sample preparing unit may comprise a principal component accepting unit, a weight calculating unit, a component base reflectance calculating unit, and a reflectance correcting unit.

The principle of this sample generating unit is as follows.

The principal component accepting unit accepts principal component vectors that determine a set of spectral reflectance data of an arbitrary color sample. The weight calculating unit calculates, based on the principal component vectors and the spectral characteristics, weights that should be applied to the principal component vectors to provide sets of spectral reflectance data of the virtual color samples corresponding to the respective color signals scattered in desired distribution. The component base reflectance calculating unit calculates sets of spectral reflectance data of the respective virtual color samples based on the calculated weights and the principal component vectors obtained by the weight calculating unit. The reflectance correcting unit corrects negative values included in the sets of spectral reflectance data to zero.

The sample preparing unit having the above configuration operates in the following manner.

The weight calculating unit calculates, based on principal component vectors accepted by the principal component accepting unit and the spectral characteristics inferred by the inferring unit 4, weights suitable for the respective principal component vectors. The component base reflectance calculating unit calculates sets of spectral reflectance data of the respective virtual color samples corresponding to the generated color signals based on the calculated weights and the principal component vectors. The reflectance correcting unit corrects negative values, if any, included in the sets of spectral reflectance data calculated by the component base reflectance calculating unit to zero.

The table generating unit 5 provided in the color coordinate transformation table generation apparatus of FIG. 2 may comprise the same units as the second preceding table generating unit 5 does and the sample preparing unit may comprise a model generating unit, an inverse calculating unit, a model base reflectance calculating unit, and a reflectance correcting unit.

The principle of this sample preparing unit is as follows.

The model generating unit generates a model equation that relates an arbitrary color signal to a set of spectral reflectance data of a virtual color sample that provides the arbitrary color signal. The inverse calculating unit calculates a pseudo-inverse of a matrix representing the spectral characteristics of the color reading device in the model equation. The model base reflectance calculating unit calculates sets of spectral reflectance data of the respective virtual color samples based on the color signals scattered in desired distribution and the calculated pseudo-inverse. The reflectance correcting unit corrects negative values included in the sets of spectral reflectance data to zero.

The sample preparing unit having the above configuration operates in the following manner.

The model generating unit generates a model equation that relates an arbitrary color signal to a set of spectral reflectance data of a virtual color sample that provides the arbitrary color signal. The inverse calculating unit calculates a pseudo-inverse of a matrix representing the spectral characteristics in the model equation. The model base reflectance calculating unit calculates sets of spectral reflectance data of the respective virtual color samples by calculating the products of the generated color signals and the calculated pseudo-inverse. The reflectance correcting unit corrects negative values, if any, included in the sets of spectral reflectance data calculated by the model base reflectance calculating unit to zero.

The table generating unit 5 provided in the color coordinate transformation table generation apparatus of FIG. 2 may comprise a reflectance accepting unit, a color signal calculating unit, a color signal correcting unit, a chromaticity coordinate calculating unit, and a relationship determining unit.

The principle of this table generating unit 5 is as follows.

The reflectance accepting unit accepts sets of spectral reflectance data of a sufficiently large number of color samples having different colors. The color signal calculating unit calculates color signals as expected input data of the color reading device based on the sets of spectral reflectance data and the spectral characteristics that have been inferred by the inferring unit 4. The color signal correcting unit corrects negative values included in the calculated color signals to zero. The chromaticity coordinate calculating unit calculates sets of chromaticity coordinates in a desired color space that correspond to the respective sets of spectral reflectance data. The relationship determining unit determines a relationship between color signals scattered in desired distribution in the device-dependent color space and sets of chromaticity coordinates in the chromaticity coordinate space indicating, in the desired color space, colors of the color signals, respectively, based on a relationship between the calculated sets of chromaticity coordinates by the chromaticity coordinate calculating unit and the corrected color signals by the color signal correcting unit.

The table generating unit 5 having the above configuration operates in the following manner.

Based on sets of spectral reflectance data accepted by the reflectance accepting unit and the inferred spectral characteristics the color signal calculating unit calculates color signals as would be obtained when the color reading device reads color samples corresponding to the respective sets of spectral reflectance data. The calculated color signals are corrected by the color signal correcting unit and then passed to the relationship determining unit. On the other hand, the chromaticity coordinate calculating unit calculates sets of chromaticity coordinates in a desired color space based on the sets of spectral reflectance data accepted by the reflectance accepting unit and then passed to the relationship determining unit. The relationship determining unit determines a relationship between color signals distributed in grid form, for example, in the device-dependent color space and sets of chromaticity coordinates indicating, in the desired color space, true colors of color samples corresponding to the color signals, respectively, by performing interpolation on discrete elements of an association table indicating a relationship between the calculated sets of chromaticity coordinates and the corrected color signals.

[Embodiment 1]

Figure 3:
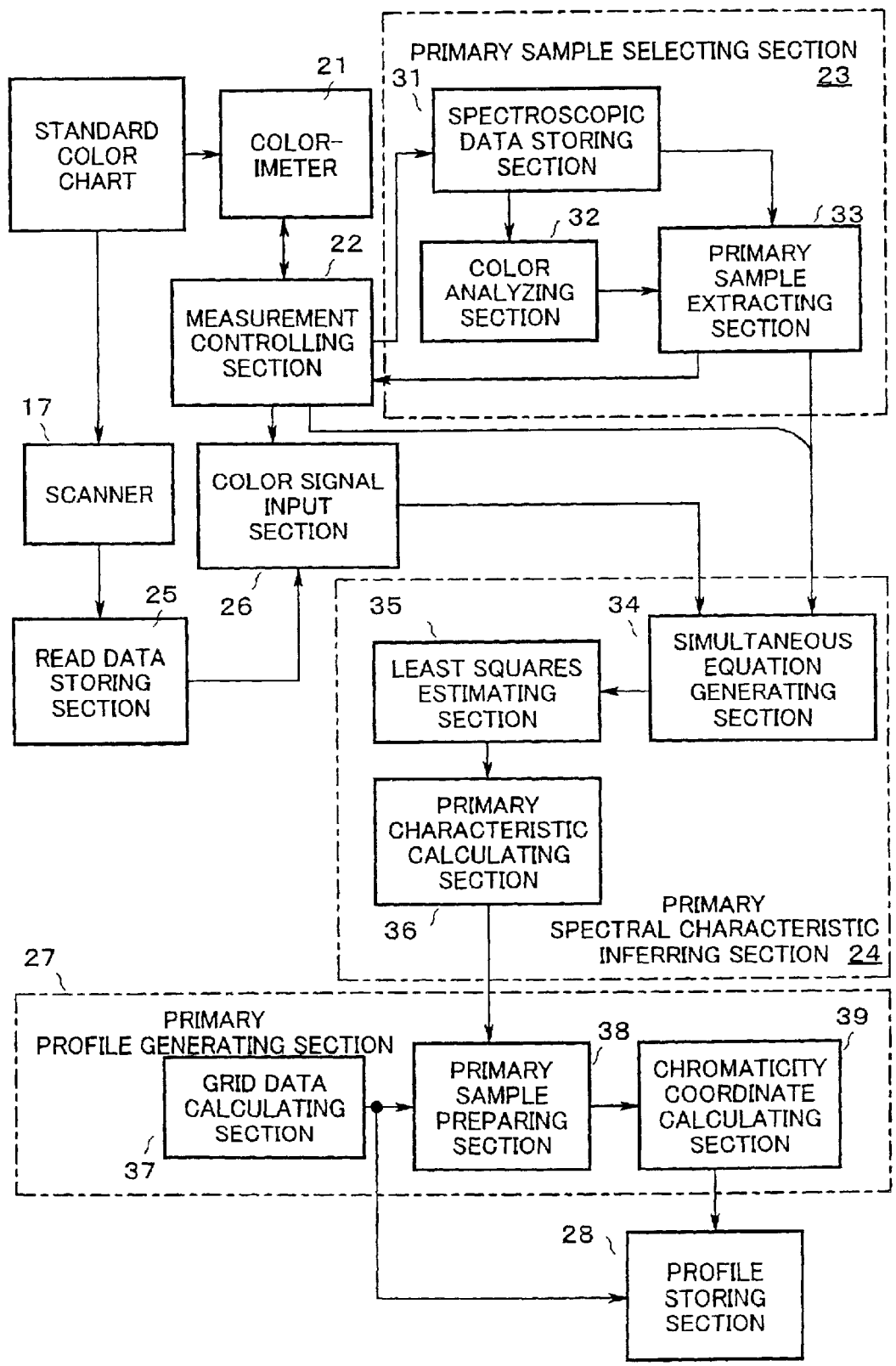
FIG. 3 is a block diagram showing a color coordinate transformation table generation apparatus according to a first embodiment of the invention.
Figure 4:
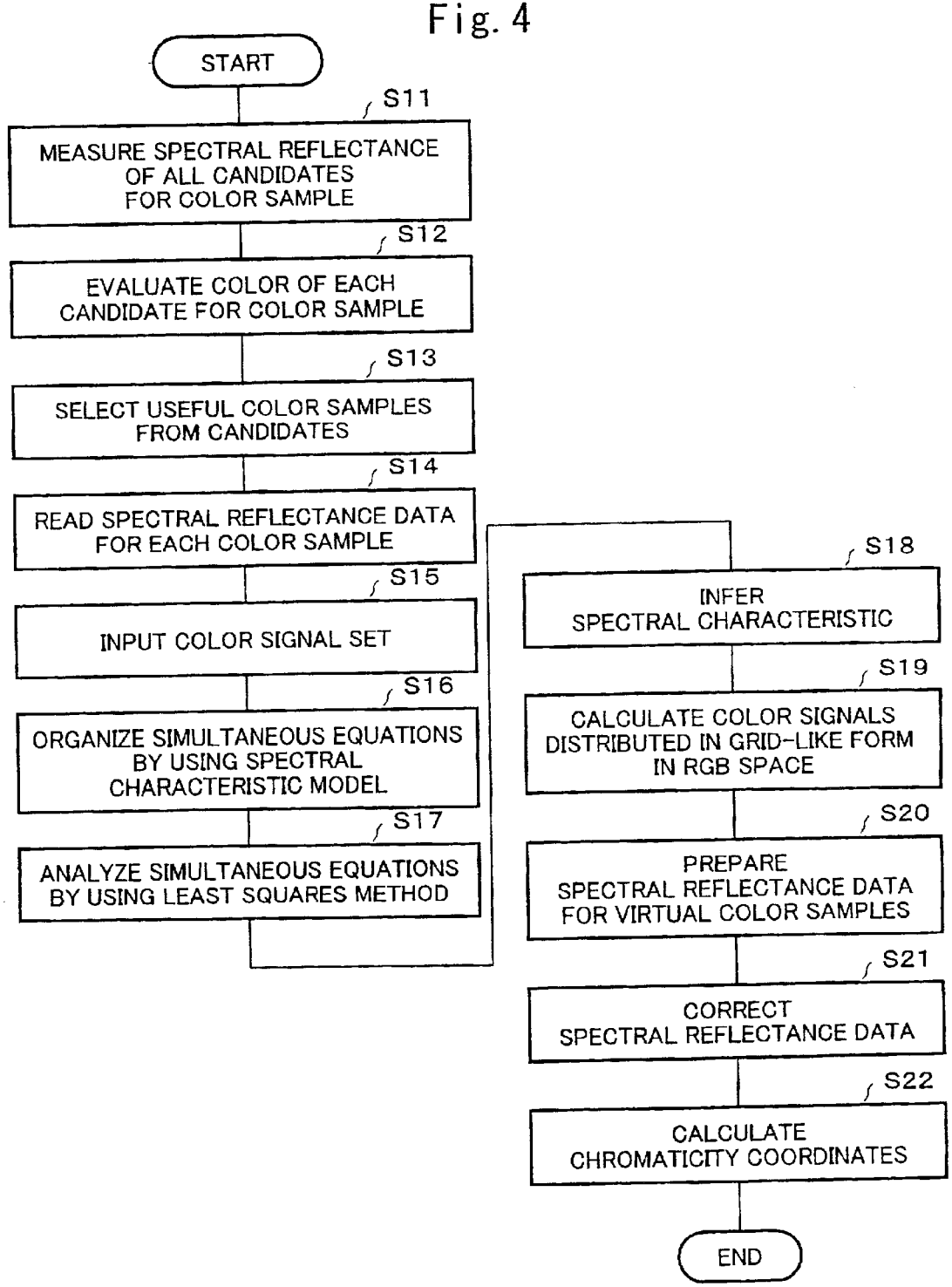
FIG. 4 is a flowchart showing how the color coordinate transformations table generation apparatus of FIG. 3 operates.

FIG. 3 shows a color coordinate transformation table generation apparatus according to an embodiment of the invention. FIG. 4 is a flowchart showing how the color coordinate transformation table generation apparatus of FIG. 3 operates.

In the color coordinate transformation table generation apparatus of FIG. 3, to produce a profile of a scanner as a subject of evaluation, sets of spectral reflectance data obtained by a colorimeter 21 are passed to a primary sample selecting section 23 via a measurement controlling section 22. Sets of reflectance data corresponding to a sample set having a proper feature are selected from those sets of spectral reflectance data by the primary sample selecting section 23 and passed to a primary spectral characteristic inferring section 24.

More specifically, first, each region of a standard color chart, for example, is employed as a candidate for a color sample and its spectral reflectance is measured by the colorimeter 21 (step S11 in FIG. 4). Measured spectral reflectance data are stored in a spectroscopic data storing section 31 of the primary sample selecting section 23. Then, hue and saturation of each color sample are evaluated by a color analyzing section 32 based on the corresponding spectral reflectance data (step S12 in FIG. 4). Evaluation results are subjected to processing in a primary sample extracting section 33.

Since the standard color chart includes a sufficiently large number of candidates for color samples, the functions of the hue evaluating unit and the saturation evaluating unit that were described in the principles are realized by the color analyzing section 32's evaluating, in the above-described manner, the color of each candidate for color sample based on spectral reflectance data obtained by measuring a corresponding region on the standard color chart obtained by colorimeter 21.

For example, where candidates for color samples are distributed as shown-in FIG. 5A on a Munsell hue circle, the primary sample extracting section 33 first extracts candidates for color samples that are high in saturation and then selects color samples so that they are distributed at equal hue intervals (step S13 in FIG. 4; see FIG. 5B).

The primary sample extracting section 33 serves as the hue base extracting unit and the saturation base extracting unit that were described in the principles by operating based on evaluation results of the color analyzing section 32 in the above-described manner. The function of the selecting unit 11 shown in FIG. 2 is realized by the primary sample extracting section 33's extracting a sample set consisting of proper color samples based on the evaluation results of the color analyzing section 32.

The primary sample extracting section 33 reads the spectral reflectance data corresponding to the color samples from the spectroscopic data storing section 31 and inputs those to the primary spectral characteristic inferring section 24 (step S14 in FIG. 4).

The primary sample extracting section 33 realizes the same function as the function of the measuring unit 12 by forming, in the above-described manner, sets of reflectance data using the spectral reflectance data stored in the spectroscopic data storing section 31.

Naturally, if, for example, the colors of candidates for color samples can be identified by their color numbers or the like, color evaluation values of the respective candidates for color samples are determined uniquely and hence color samples may be extracted based on those evaluation values. In this case, it is appropriate to measure spectral reflectance data using the colorimeter 21 for only the extracted color samples and to use resulting measurement results for processing in the primary spectral characteristic inferring section 24.

Sample set information is generated based on pieces of information for identification of the respective color samples thus extracted. The sample set information is passed to the measurement controlling section 22 and stored therein. Therefore, in producing a color coordinate transformation table next time, it is appropriate that the measurement controlling section 22 control operation of the colorimeter 21 based on the sample set information so that spectral reflectance of each of only the specified color samples is measured, and supply resulting spectral reflectance data directly to the primary spectral characteristic inferring section 24.

On the other hand, a group of color signals obtained by reading the standard color chart with the scanner 17 is stored in a read data storing section 25. A color signal set consisting of color signals corresponding to the above-mentioned sample set is selected by a color signal input section 26 from the color signals stored in the read data storing section 25, and input to the primary spectral characteristic inferring section 24 (step S15 in FIG. 4).

In this operation, the color signal input section 26 receives the above-mentioned sample set information from the measurement controlling section 22, reads the color signals specified by the sample set information from the read data storing section 25, and inputs the read-out color signals to the primary spectral characteristic inferring section 24.

The function of the accepting unit 3 shown in FIG. 2 is realized by the color signal input section 26's operating according to an instruction from the measurement controlling section 22 in the above-described manner.

Upon receiving the sets of reflectance data and the color signal set, the primary spectral characteristic inferring section 24 performs processing of inferring spectral characteristics of the scanner 17 for the respective components of a color signal.

Components $R_j$, $G_j$, $B_j$ of a color signal corresponding to a jth color sample are given by Equations (1) using spectral reflectance values $Ref_j(\lambda)$ of the jth color sample, a spectral characteristic $L(\lambda)$ of a light source of the scanner 17 that illuminates the jth color sample, spectral sensitivity characteristics $S_i(\lambda)$ (i=R, G, B) of sensors $S_r$, $S_g$, and $S_b$ of the scanner 17 corresponding to the respective components $R_j$, $G_j$, $B_j$.

$$R_j = \sum_{\lambda=\lambda_1}^{\lambda_n} L(\lambda) \cdot Ref_j(\lambda) \cdot S_R(\lambda) \qquad (1)$$

$$G_j = \sum_{\lambda=\lambda_1}^{\lambda_n} L(\lambda) \cdot Ref_j(\lambda) \cdot S_G(\lambda)$$

$$B_j = \sum_{\lambda=\lambda_1}^{\lambda_n} L(\lambda) \cdot Ref_j(\lambda) \cdot S_B(\lambda)$$

The entire spectral characteristics $LS_i(\lambda)$ of the scanner 17 are given by the products of the spectral characteristic $L(\lambda)$ of the light source and the spectral sensitivity $S_i(\lambda)$ of the sensors, respectively.

Therefore, where the spectral characteristic $L(\lambda)$ of the light source is unknown, it is appropriate to substitute color signals and spectral reflectance data obtained for m color samples into Equations (1) and solve, for each spectral characteristic $LS_i(\lambda)$, simultaneous equations relating to the corresponding one of the R, G, and B components.

Figure 6:
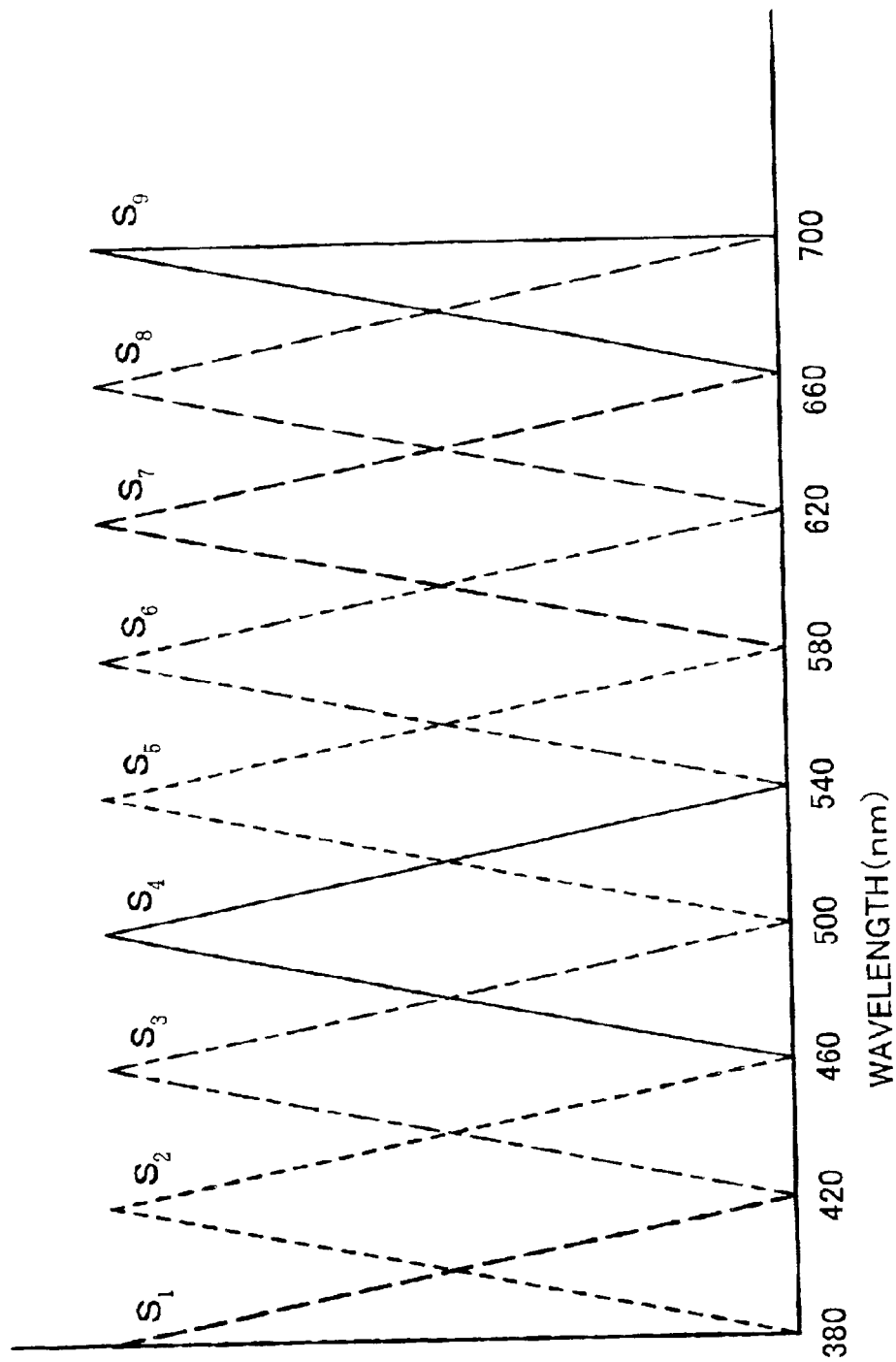
FIG. 6 is a graph illustrating a spectral characteristic model.

A model is now employed in which each spectral characteristic $LS_i(\lambda)$ is represented by a linear combination of L spline functions $C_k$ having different peak positions.

Where nine primary spline functions $C_k$ (k=1–9) shown in FIG. 6 are used as a set of spline functions, each spectral characteristic $LS_i(\lambda)$ is given by Equation (2) using discrete spline function values $C_k(i,\lambda)$ (i=R, G, B) of the wavelengths $\lambda$ ($\lambda=\lambda_1-\lambda_n$) and the R, G, and B components and weights $W_{ik}$ for the respective spline functions Ck.

$$\begin{pmatrix} LS_i(\lambda_1) \\ LS_i(\lambda_2) \\ \vdots \\ LS_i(\lambda_n) \end{pmatrix} = \begin{pmatrix} C_{1(i,\lambda_1)} & C_{2(i,\lambda_1)} & \cdots & C_{9(i,\lambda_1)} \\ C_{1(i,\lambda_2)} & C_{2(i,\lambda_2)} & \cdots & C_{9(i,\lambda_2)} \\ \vdots & \vdots & \ddots & \vdots \\ C_{1(i,\lambda_n)} & C_{2(i,\lambda_n)} & \cdots & C_{9(i,\lambda_n)} \end{pmatrix} \cdot \begin{pmatrix} W_{i1} \\ W_{i2} \\ \vdots \\ W_{i9} \end{pmatrix} \qquad (2)$$

Therefore, for example, a simultaneous equation generating section 34 shown in FIG. 3 generates simultaneous equations (Equation (3)) that relate the R-component values $R_j$ of the color signal to the weights $W_{ik}$ for the nine spline functions by substituting Equation (2) into the spectral characteristic $LS_R(\lambda)$ for the R component (see Equations (1)), for example, so that the resulting simultaneous equations (3) will be used for processing in a least squares estimating section 35 (step S16 in FIG. 4).

$$\begin{pmatrix} R_1 \\ R_2 \\ \vdots \\ R_m \end{pmatrix} = \begin{pmatrix} \sum_{\lambda=\lambda_1}^{\lambda_n} Ref_1(\lambda) \cdot C_{1(R,\lambda)} & \sum_{\lambda=\lambda_1}^{\lambda_n} Ref_1(\lambda) \cdot C_{2(R,\lambda)} & \cdots & \sum_{\lambda=\lambda_1}^{\lambda_n} Ref_1(\lambda) \cdot C_{9(R,\lambda)} \\ \sum_{\lambda=\lambda_1}^{\lambda_n} Ref_2(\lambda) \cdot C_{1(R,\lambda)} & \sum_{\lambda=\lambda_1}^{\lambda_n} Ref_2(\lambda) \cdot C_{2(R,\lambda)} & \cdots & \sum_{\lambda=\lambda_1}^{\lambda_n} Ref_2(\lambda) \cdot C_{9(R,\lambda)} \\ \vdots & \vdots & \ddots & \vdots \\ \sum_{\lambda=\lambda_1}^{\lambda_n} Ref_m(\lambda) \cdot C_{1(R,\lambda)} & \sum_{\lambda=\lambda_1}^{\lambda_n} Ref_m(\lambda) \cdot C_{2(R,\lambda)} & \cdots & \sum_{\lambda=\lambda_1}^{\lambda_n} Ref_m(\lambda) \cdot C_{9(R,\lambda)} \end{pmatrix} \cdot \begin{pmatrix} W_{R1} \\ W_{R2} \\ \vdots \\ W_{R9} \end{pmatrix} \quad (3)$$

In this example, for example, weights $W_{Rk}$ for the respective spline functions $C_k$ are determined by substituting, into Equation (3), sets of reflectance data of m color samples that have been obtained through measurements at wavelengths that are set in a wavelength range of 380–700 nm at intervals of 10 nm and m color signals (i.e., R-component values) obtained by reading the m color samples with the scanner 17. As a result, values of a spectral characteristic $LS_R(\lambda)$ of the scanner 17 at the 33 sampling wavelengths of the spectral reflectance measurement are determined.

That is, weights $W_{ik}$ for the nine respective spline functions $C_k$ are determined by solving the simultaneous equations relating to each color signal component using sets of spectral reflectance data and a color signal set obtained for 24 color samples so that spectral characteristics $LS_i(\lambda)$ of the scanner 17 are obtainable at the 33 sampling wavelengths that have intervals of 10 nm in the wavelength range of 380–700 nm. In this manner, accurate inference of the spectral characteristic $LS_i(\lambda)$ is possible.

In this example, the number of weights $W_{ik}$ to be determined according to the simultaneous equation (3) is small. Therefore, if sets of reflectance data linearly independent to an expected degree are obtained, the least squares estimating section 35 can determine weights $W_{ik}$ with sufficiently high accuracy by analyzing the simultaneous equation (step S17 in FIG. 4).

A primary characteristic calculating section 36 shown in FIG. 3 calculates discrete values of a spectral characteristic of each color signal component of the scanner 17 at the above-mentioned sampling wavelengths based on the determined weights $W_{ik}$, and infers smooth spectral characteristics of the respective color components (indicated by characters R, G, and B in FIG. 7B) of the scanner 17 as shown in FIG. 7B through interpolation using the discrete values by a proper method (step S18 in FIG. 4).

Since the number of variables to be determined is decreased by employing the above-described model, spectral characteristic values of the scanner 17 can be determined at a sufficiently large number of sampling wavelengths based on a small number of measurement results. And smooth spectral characteristics of the respective color components (indicated by characters R, G, and B in FIG. 7B) of the scanner 17 can be inferred as shown in FIG. 7B based on those discrete values.

Since spectral characteristics of the scanner 17 can be inferred based on a small number of measurement results, naturally the load of the work of producing, through measurements by the calorimeter 21, spectral reflectance data of the respective color samples can be reduced. Further, it becomes possible to use, for inference of spectral characteristics of the scanner 17, only useful measurements results, resulting in increase in accuracy of inferring spectral characteristics of the scanner 17.

As shown in FIG. 7A, spectral reflectance data fluctuates gently in a wide wavelength range. Therefore, it is apparent that unduly increasing the number of spectral reflectance data to constitute sets of spectral reflectance data greatly lowers the degree of linear independence of a simultaneous equation that is used for processing in the least squares estimating section 35.

Therefore, decreasing, in the above-described manner, the number of measurement results necessary to infer spectral characteristics of the scanner 17 is very effective in view of properties of actual color samples.

A profile is generated by the primary profile generating section 27 shown in FIG. 3 based on thus obtained spectral characteristics of the scanner 17, and stored in a profile storing section 28.

In the primary profile-generating section 27, a grid data calculating section 37 corresponds to the color signal generating unit that was described in the principles. For example, the grid data calculating section 37 generates N color signals that are distributed in the RGB color space in the form of a grid having proper intervals (step S19 in FIG. 4) and stores the generated color signals one by one in the profile storing section 28.

The color signals generated by the grid data calculating section 37 are passed to a primary sample preparing section 38, which corresponds to the sample preparing unit that was described in the principles. The primary sample preparing section 38 calculates virtual spectral reflectance data of the color samples to be associated with the respective color signals.

A chromaticity coordinate calculating section 39 shown in FIG. 3 corresponds to the chromaticity calculating unit that was described in the principles. Based on the spectral reflectance data that have been calculated by the primary sample preparing section 38, the chromaticity coordinate calculating section 39 calculates sets of chromaticity coordinates indicating corresponding colors in the L*a*b* color space, for example, and stores the calculated sets of chromaticity coordinates in the profile storing section 28 so that they are correlated with the respective color signals.

Figure 8:
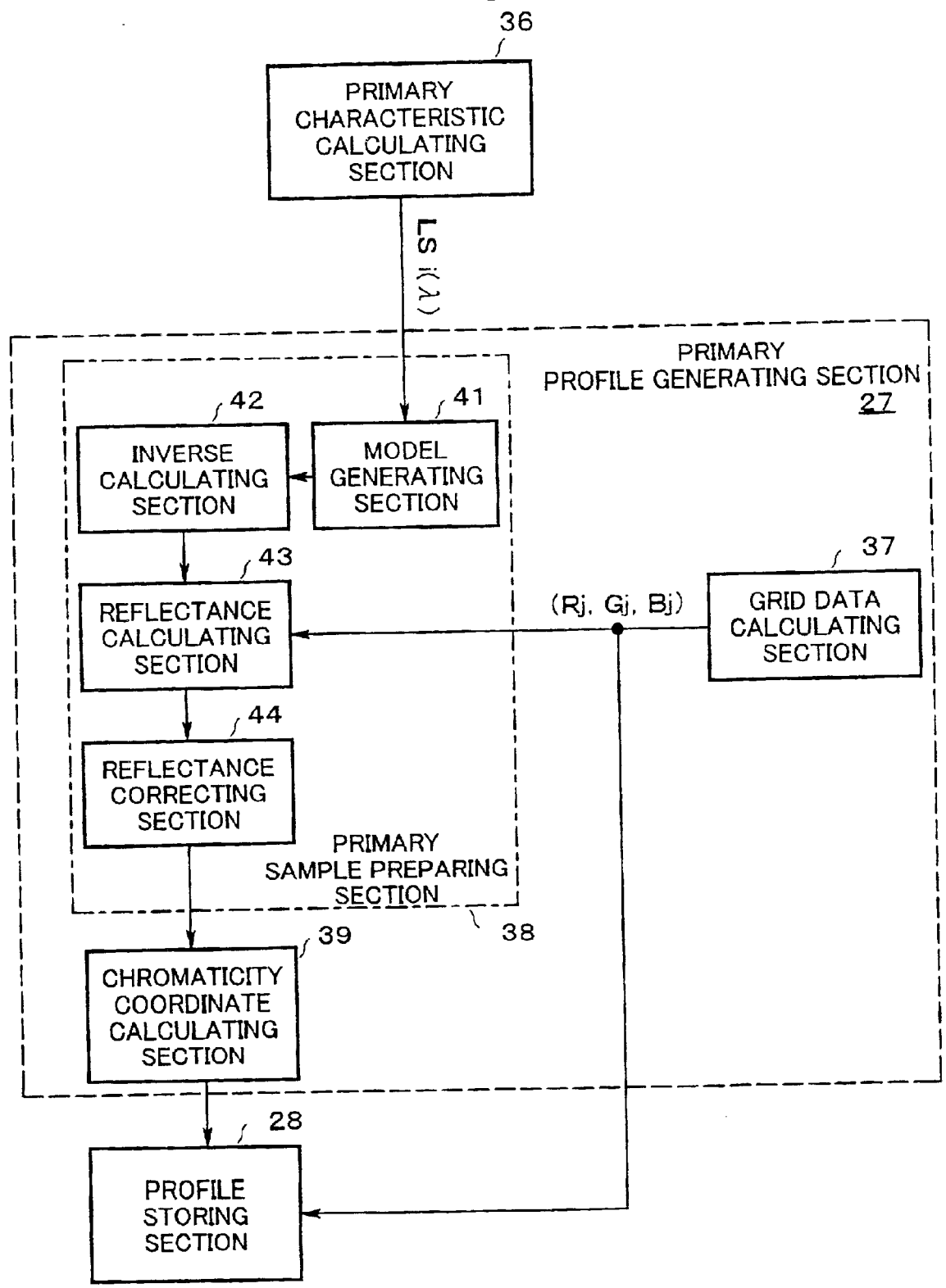
FIG. 8 is a block diagram showing a detailed configuration of a primary profile generating section.

FIG. 8 shows a detailed configuration of the primary profile generating section 27.

In the primary sample preparing section 38 shown in FIG. 8, a model generating section 41 corresponds to the model generating unit that was described in the principles. The model generating section 41 receives discrete values of spectral characteristics $LS_i(\lambda)(\lambda=\lambda_1-\lambda_n)$ from the primary characteristic calculating section 36, and generates a model equation (the following Equation (4)) that gives a color signal (R, G, and B) that should be obtained when a virtual color sample is read by using spectral reflectance data Ref($\lambda$) ($\lambda=\lambda_1-\lambda_n$) for the color sample and a matrix LS having, as elements, the discrete values of the spectral characteristics $LS_1(\lambda)$.

$$\begin{pmatrix} R \\ G \\ B \end{pmatrix} = (LS) \cdot \begin{pmatrix} Ref(\lambda_1) \\ Ref(\lambda_2) \\ \vdots \\ Ref(\lambda_n) \end{pmatrix} \quad (4)$$

By multiplying the both sides of the model equation (4) by the pseudo-inverse $LS^+$ of the matrix LS, the Equation (4) is modified into the following Equation (5). It is therefore apparent that spectral reflectance data $Ref(\lambda)$ for a virtual color sample corresponding to an arbitrary color signal (R, G, and B) can be obtained according to Equation (5).

$$LS^+ \cdot \begin{pmatrix} R \\ G \\ B \end{pmatrix} = I \cdot \begin{pmatrix} Ref(\lambda_1) \\ Ref(\lambda_2) \\ \vdots \\ Ref(\lambda_n) \end{pmatrix} \quad (5)$$

Therefore, the function of the inverse calculating unit that was described in the principles can be realized in such a manner that an inverse calculating section 42 shown in FIG. 8 calculates, according to the following Equation (6), the pseudo-inverse $LS^+$ of the matrix LS that represents the spectral characteristic of the scanner 17.

$$L S^+ = (L S^T \cdot L S)^{-1} \cdot L S^T \quad (6)$$

A reflectance calculating section 43 shown in FIG. 8 corresponds to the model base reflectance calculating unit that was described in the principles. The reflectance calculating section 43 substitutes, one by one, color signals ($R_j$, $G_j$, $B_j$) (J=1–N) received from the grid data calculating section 37 into Equation (5) and thereby calculates spectral reflectance data $Ref_j(\lambda)$ ($\lambda=\lambda_1-\lambda_n$) corresponding to the respective color signals (step S20 in FIG. 4).

FIG. 9A shows measured reflectance data (thin solid line) obtained by measuring an actual color sample and estimated reflectance data (thick solid line) calculated based on a color signal obtained by reading the color sample with the scanner 17 and an inferred spectral characteristic of the scanner 17. It is seen from FIG. 9A that estimated reflectance data substantially equivalent to measured ones can be obtained by the above-described sample generation processing.

However, although spectral reflectance does not have a negative value in reality, the estimated reflectance data shown in FIG. 9A have small negative values in a wavelength range of 450–500 nm.

It is considered that the reason why unrealistic values occur in estimated reflectance data as exemplified above is that inferred values that should be positive values very close to zero have been canceled out due to color signal measurement errors and errors in inferring spectral characteristics of the scanner 17 and error components appear as negative values.

In view of the above, a reflectance correcting section 44 shown in FIG. 8 corrects negative values included in the reflectance data obtained in the above-described manner to zero (step S21 in FIG. 4). In this manner, the reflectance correcting section 44 realizes the function of the reflectance correcting unit that was described in the principles. As a result, reflectance data that are more suitable for the virtual color samples can be generated by eliminating influences of measurement errors and inference errors and used for processing in the chromaticity coordinate calculating section 39.

The chromaticity coordinate calculating section 39 operates receiving those reflectance data, whereby proper sets of chromaticity coordinates indicating colors of the virtual samples in the L*a*b* color space can be obtained so as to correspond to the respective color signals obtained by the grid data calculating section 37 (step S22 in FIG. 4).

Setting, in the above-described manner, the set of virtual color samples corresponding to the N color signals that are scattered in a desired distribution in the RGB color space makes it possible to generate a highly accurate profile by directly using the inferred spectral characteristics of the scanner 17.

In doing so, it is not necessary to newly measure spectral reflectance values or color signals. Therefore, an association table, which has about 5,000 pairs of necessary entries for a profile of the scanner 17, can be generated based on the measurement data of the m color samples that were used in inferring the spectral characteristics of the scanner 17.

The inventors conducted an experiment for studying a relationship between the number of color samples used for inferring spectral characteristics of the scanner 17 and the inference error.

Attention should be paid to the fact that what should be obtained finally in the color coordinate transformation table generation apparatus according to the embodiment are chromaticity coordinates. Therefore, color differences between chromaticity coordinates obtained from spectral reflectance values calculated by using inferred spectral characteristics of the scanner 17 and chromaticity coordinates obtained based on measured values were employed as indices for evaluation of inference errors, and an average value of color differences that were obtained for the 288 color samples constituting the standard color chart.

FIG. 9B shows a relationship, obtained by the experiment, between the number of color samples and the inference error. As shown in FIG. 9B, the inference error remained approximately at a constant value even when the number of color samples used for inferring spectral characteristics of the scanner 17 decreased to 24.

That is, according to the color coordinate transformation table generation apparatus of the embodiment, a profile that is an association table having about 5,000 pairs of entries can be generated based on measurement results of 24 selected color samples.

The color coordinate transformation table generation apparatus for generating a highly accurate color coordinate transformation table based on measurement results of a small number of color samples according to the color coordinate transformation table generation method of the embodiment can be realized in such a manner that the individual sections shown in FIG. 3 operate in the above-described manner.

As a result, it becomes possible to greatly reduce the amounts of the operation of measuring spectral reflectance values of color samples and the operation of reading the color samples with a scanner as a subject of evaluation and to thereby reduce, to a large extent, the load of the entire operation of generating a color coordinate transformation table.

[Embodiment 2]

Figure 10:
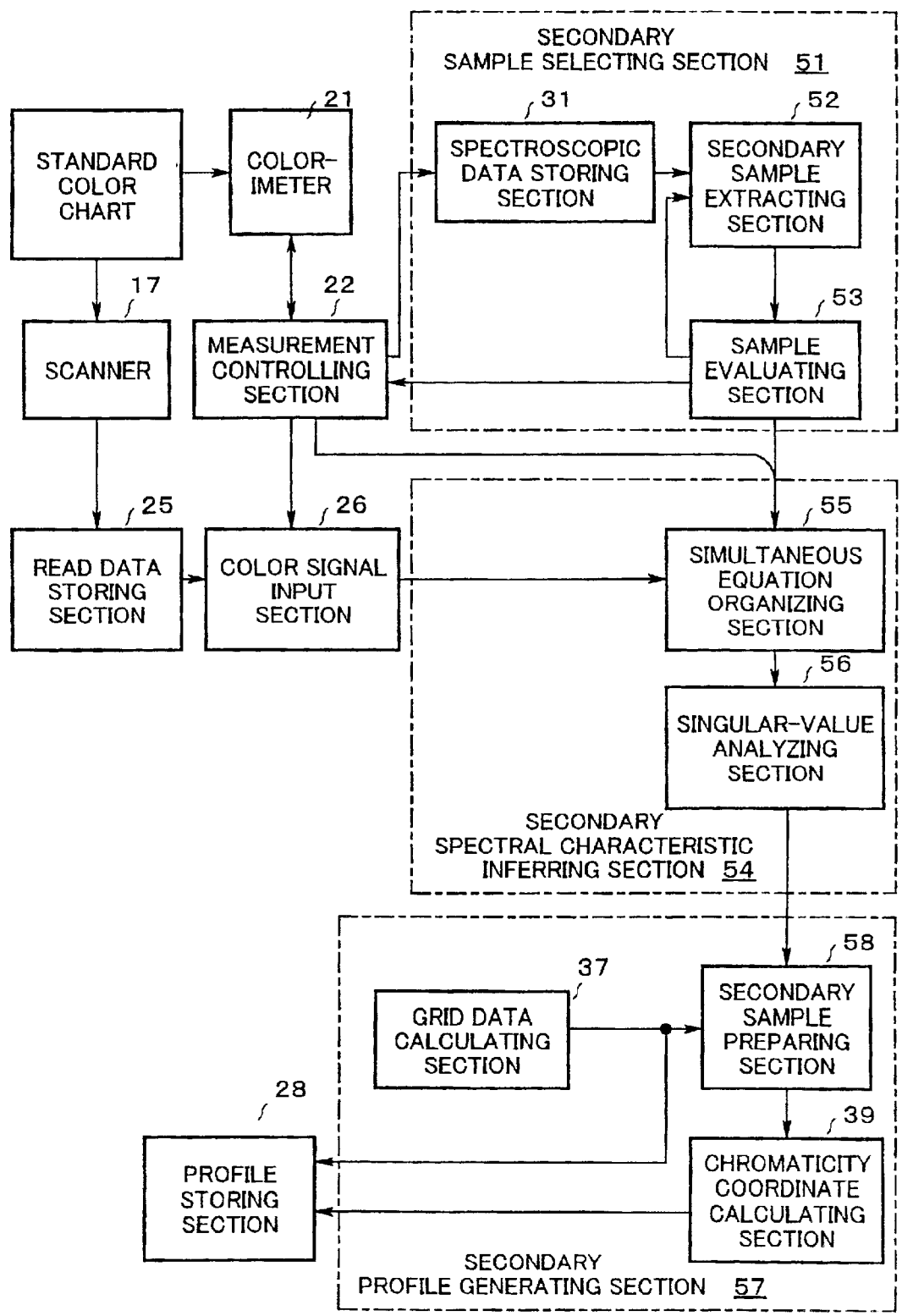
FIG. 10 is a block diagram showing a color coordinate transformation table generation apparatus according to a second embodiment of the invention.
Figure 11:
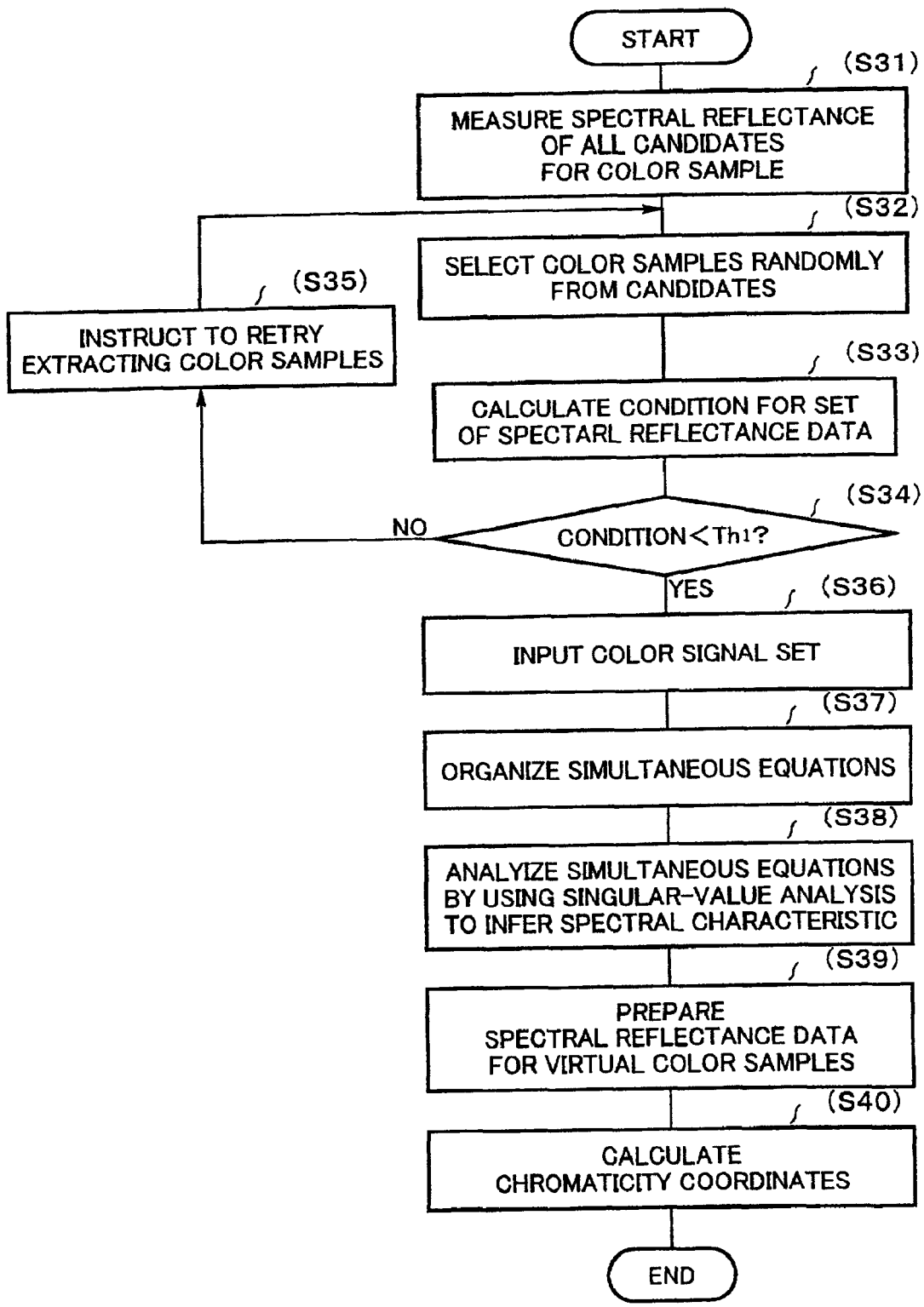
FIG. 11 is a flowchart showing how the color coordinate transformation table generation apparatus of FIG. 10 operates.

FIG. 10 shows a color coordinate transformation table generation apparatus according to another embodiment of the invention. FIG. 11 is a flowchart showing how the color coordinate transformation table generation apparatus of FIG. 10 operates.

The color coordinate transformation table generation apparatus of FIG. 10 is equipped with a secondary sample selecting section 51, a secondary spectral characteristic inferring section 54, and a secondary profile generating section 57, which correspond to the selecting unit 1, the inferring unit 4, and the table generating unit 5, respectively, that were described in the principles.

Spectral reflectance data obtained through measurements by a colorimeter 21 shown in FIG. 10 are stored in a spectroscopic data storing section 31 via a measurement controlling section 22 in the same manner as in the first embodiment (step S31 in FIG. 11) so as to be used for processing in a secondary sample selecting section 51.

In the secondary sample selecting section 51, a secondary sample extracting section 52 corresponds to the simple extracting unit that was described in the principles. For example, the secondary sample selecting section 51 randomly extracts m color samples from the candidates for color samples that were measured by the colorimeter 21 (step S32 in FIG. 11), reads spectral reflectance data corresponding to those color samples from the spectroscopic data storing section 31, and supplies a sample evaluating section 53.

Receiving the spectral reflectance data, first, the sample evaluating section 53 arranges the spectral reflectance data $Ref_j(J=1-m, \lambda=\lambda_1-\lambda_n)$ corresponding to the m color samples like the following Expression (7) as elements of a matrix Ref of sets of spectral reflectance data corresponding to a sample set consisting of the above-mentioned color samples.

$$\begin{pmatrix} Ref(1,\lambda_1) & Ref(1,\lambda_2) & \cdots & Ref(1,\lambda_n) \\ Ref(2,\lambda_1) & Ref(2,\lambda_2) & \cdots & Ref(2,\lambda_n) \\ \vdots & \vdots & \ddots & \vdots \\ Ref(m,\lambda_1) & Ref(m,\lambda_2) & \cdots & Ref(m,\lambda_n) \end{pmatrix} \quad (7)$$

Then, the sample evaluating section 53 calculates a condition of the matrix Ref by performing singular value decomposition on it (step S33 in FIG. 11) and evaluates the linear independence of the sets of spectral reflectance data by comparing the calculated condition with a predetermined threshold value $Th_1$.

If the condition is greater than the $Th_1$ (negative judgment at step S34 in FIG. 11), the sample evaluating section 53 acts as the repeat unit that was described in the principles and instructs the secondary sample extracting section 52 to extract a sample set again with a judgment that the degree of linear independence of the sets of spectral reflectance data is not sufficiently high (step S35 in FIG. 11).

In response, the process returns to step S32, where the secondary sample extracting section 52 extracts a sample set again.

The secondary sample extracting section 52 may either discard the previous sample set and extract a new one, or stores the previous sample set (see FIG. 12A), extracts a predetermined number of color samples from the candidates for color samples excluding the stored color samples, and adds the newly extracted color samples to the stored ones (see FIG. 12B).

If it is judged that the condition is smaller than the threshold value $Th_1$ (affirmative judgment at step S34 in FIG. 11) as the extraction and evaluation of a sample set are repeated in the above manner, the sample evaluating section 53 operates as the output unit that was described in the principles and inputs the spectral reflectance data corresponding to an extracted sample set to the secondary spectral characteristic inferring section 54 (step S36 in FIG. 11) with a judgment that the degree of linear independence of the sets of spectral reflectance data is sufficiently high.

Sample set information indicating the sample set thus extracted is passed to the measurement controlling section 22 in the same manner as in the first embodiment and stored therein so as to be used for future measurement control.

Since a sample set is selected so as to consist of optimized color samples corresponding to spectral reflectance data whose degree of linear independence is high, high estimation accuracy can be assured in inferring spectral characteristics of the scanner 17 in the following processing sections.

Upon the input of the sample set information, the measurement controlling section 22 controls operation of a color signal input section 26 in the same manner as in the first embodiment, whereby a color signal set consisting of color signals $(R_j, G_j, B_j)$ (j=1-m) corresponding to the color samples indicated by the sample set information is selected from reading results of a scanner 17 that are stored in a read data storing section 25 and input to the secondary spectral characteristic inferring section 54 (step S36 in FIG. 11).

In the secondary spectral characteristic inferring section 54 shown in FIG. 10, a simultaneous equations organizing section 55 corresponds to the simultaneous equation generating unit that was described in the principles. Receiving the color signal set and the sets of reflectance data Ref, the simultaneous equations organizing section 55 organizes a simultaneous equation (the following Equation (8)) that relates G components of the color signal set to the sets of reflectance data by using a spectral characteristic $LS_G(\lambda)$ $(\lambda=\lambda_1-\lambda_n)$ for the G component (step 537 in FIG. 11).

$$\begin{pmatrix} G_1 \\ G_2 \\ \vdots \\ G_m \end{pmatrix} = \begin{pmatrix} Ref(1,\lambda_1) & Ref(1,\lambda_2) & \cdots & Ref(1,\lambda_n) \\ Ref(2,\lambda_1) & Ref(2,\lambda_2) & \cdots & Ref(2,\lambda_n) \\ \vdots & \vdots & \ddots & \vdots \\ Ref(m,\lambda_1) & Ref(m,\lambda_2) & \cdots & Ref(m,\lambda_n) \end{pmatrix} \cdot \begin{pmatrix} LS_{G,\lambda_1} \\ LS_{G,\lambda_2} \\ \vdots \\ LS_{G,\lambda_n} \end{pmatrix} \quad (8)$$

Similarly, the simultaneous equations organizing section 55 organizes simultaneous equations for R components and B components of the color signal set so that the resulting simultaneous equations will be used in processing in a singular value analyzing section 56.

Figure 13:
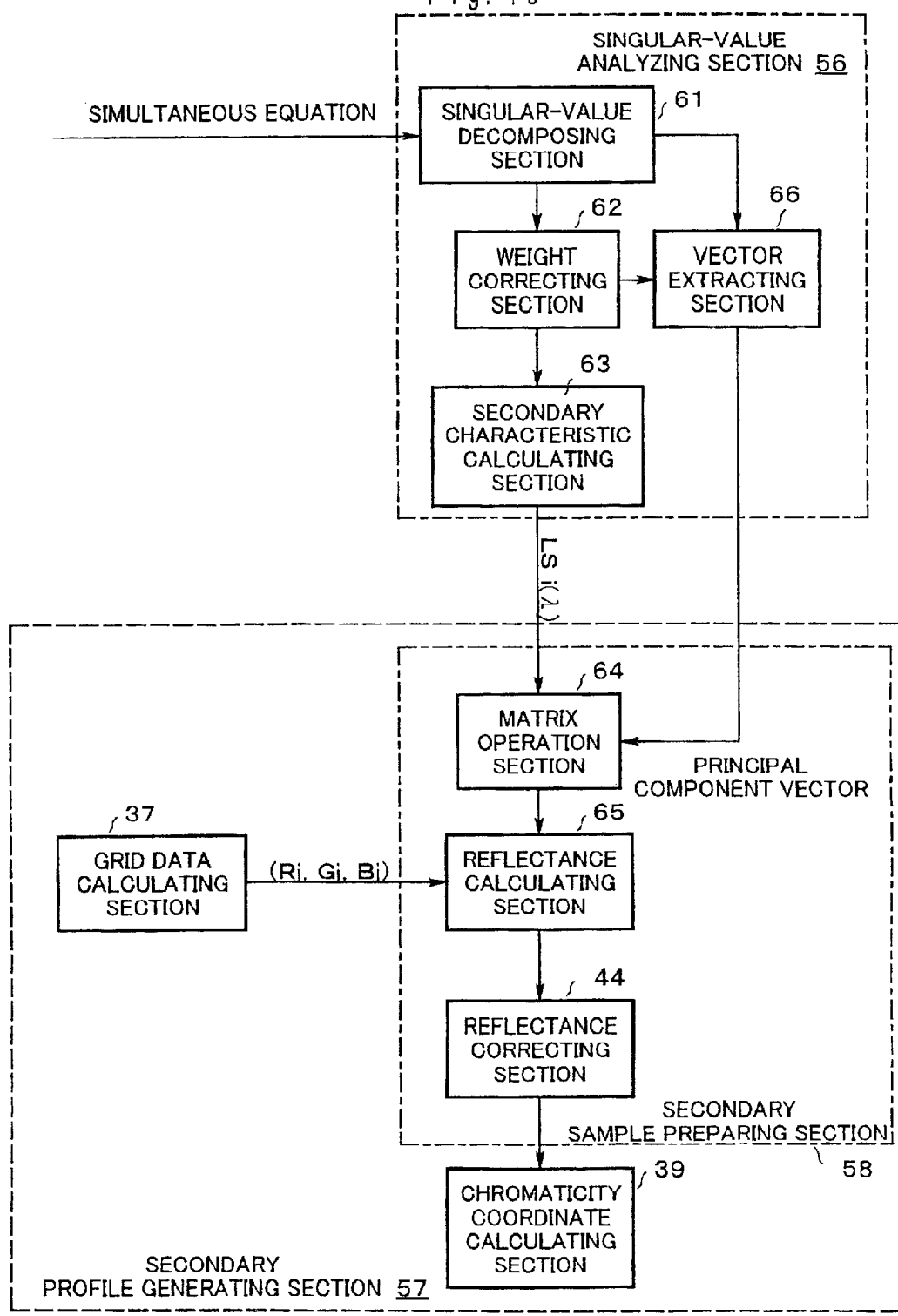
FIG. 13 shows detailed configurations of a singular value analyzing section and a secondary sample selecting section.

FIG. 13 shows detailed configurations of the singular value analyzing section 56 and a secondary sample preparing section 58.

In the singular value analyzing section 56 shown in FIG. 13, a singular value decomposing section 61 corresponds to the singular value analyzing unit that was described in the principles. The singular value decomposing section 61 decomposes, according to a singular value decomposition technique, the sets of spectral reflectance data Ref into a nonsingular matrix U, a matrix P consisting of principal component vectors $P(j, \lambda)(j=1-n, \lambda=\lambda_1-\lambda_n)$, and a diagonal matrix W having weights $W_j$ (=1-n) as diagonal elements (see the following Equation (9)).

$$Ref = U \cdot \begin{pmatrix} W_1 & & & 0 \\ & W_2 & & \\ & & \ddots & \\ 0 & & & W_n \end{pmatrix} \cdot \begin{pmatrix} P_{(1,\lambda_1)} & P_{(2,\lambda_1)} & \cdots & P_{(n,\lambda_1)} \\ P_{(1,\lambda_2)} & P_{(2,\lambda_2)} & \cdots & P_{(n,\lambda_2)} \\ \vdots & \vdots & \ddots & \vdots \\ P_{(1,\lambda_n)} & P_{(2,\lambda_n)} & \cdots & P_{(n,\lambda_n)} \end{pmatrix} \quad (9)$$

An weight correcting section 62 shown in FIG. 13 compares the weights $W_j$(j=1-n) that have been calculated during the course of the above singular value decomposition processing with a threshold value $Th_2$ (described later), and corrects the values of the weights $W_j$ that have been obtained by the singular value decomposing section 61 based on comparison results.

In doing so, first, the weight correcting section 62 calculates the threshold value $Th_2$ according to Equation (10)

using a maximum value $W_{max}$ of the weights $W_j$ and the number S of significant figures of the spectral reflectance data obtained by the colorimeter 21.

$$Th_2 = W_{max}/S \quad (10)$$

If a weight $W_j$ is smaller than the thus-obtained threshold value $Th_2$, it can be said that the corresponding principal component vector $P(j, \lambda)$ is an ineffective one that does not contribute to the spectral reflectance data.

The weight correcting section 62 replaces weights $W_j$ that are smaller than the threshold value $Th_2$ with zero, whereby the weight correcting section 62 realizes the function of the vector selecting unit that was described in the principles. As a result, ineffective principal component vectors can be removed and only usable principal component vectors can be used for processing in a secondary characteristic calculating section 63.

The secondary characteristic calculating section 63 shown in FIG. 13 corresponds to the characteristic calculating unit that was described in the principles. The secondary characteristic calculating section 63 applies the correction results of the weight correcting section 62 to Equation (9), substitutes the sets of spectral reflectance data Ref that are given by Equation (9) into the simultaneous equations (8) of the respective components, and solves the simultaneous equations (8) for the respective spectral characteristics $LS_i$, whereby spectral characteristics $LS_i(\lambda)$ (i=R, G, B, $\lambda = \lambda_1 - \lambda_n$) at the respective sampling wavelengths $\lambda$ can be determined (step S38 in FIG. 11).

The thus-obtained spectral characteristics $LS_1(\lambda)$ is input to the secondary profile generating section 57 so as to be used in processing in the secondary sample preparing section 58.

A vector extracting section 66 shown in FIG. 13 receives the results of the comparison between the weights $W_j$ and the threshold value $Th_2$ from the weight correcting section 62, extracts only usable principal component vectors from the n principal component vectors obtained by the singular vector decomposing section 61, and inputs the extracted principal component vectors to the secondary sample preparing section 58, whereby the function of the principal component accepting unit that was described in the principles can be realized.

Spectral reflectance data Ref($\lambda$) corresponding to an arbitrary color sample can be represented by a linear combination of the principal component vectors $P(L, \lambda)$ that were obtained according to the singular value analysis method (see the following Equation (11)).

$$(Ref(\lambda_1) Ref(\lambda_2) \cdots Ref(\lambda_n)) = \begin{pmatrix} P_{(1,\lambda 1)} & P_{(2,\lambda 1)} & \cdots & P_{(n,\lambda 1)} \\ P_{(1,\lambda 2)} & P_{(2,\lambda 2)} & \cdots & P_{(n,\lambda 2)} \\ \vdots & \vdots & \ddots & \vdots \\ P_{(1,\lambda n)} & P_{(2,\lambda n)} & \cdots & P_{(n,\lambda n)} \end{pmatrix} \cdot \begin{pmatrix} W_1 \\ W_2 \\ \vdots \\ W_n \end{pmatrix} \quad (11)$$

On the other hand, a relationship of the following Equation (12) holds between a color signal (R, G, B), spectral reflectance data Ref($\lambda$), and spectral characteristics $LS_i(\lambda)$ of the scanner 17 that have been obtained for the same color sample.

$$\begin{pmatrix} R \\ G \\ B \end{pmatrix} = \quad (12)$$

-continued $$\begin{pmatrix} LS_R(\lambda_1) & LS_R(\lambda_2) & \cdots & LS_R(\lambda_n) \\ LS_G(\lambda_1) & LS_G(\lambda_2) & \cdots & LS_G(\lambda_n) \\ LS_B(\lambda_1) & LS_B(\lambda_2) & \cdots & LS_B(\lambda_n) \end{pmatrix} \cdot (Ref(\lambda_1) Ref(\lambda_2) \cdots Ref(\lambda_n))$$

Where the spectral reflectance data Ref($\lambda$) are represented by a linear combination of three principal component vectors $P_1$, $P_2$, and $P_3$, the following Equation (13) is obtained by substituting Equation (11) into Equation (12), and weights $W_1$, $W_2$, and $W_3$ corresponding to the respective component vectors $P_1$, $P_2$, and $P_3$ can be determined uniquely by Equation (13) relating to an arbitrary color signal (R, G, B).

$$\begin{pmatrix} R \\ G \\ B \end{pmatrix} = \begin{pmatrix} LS_R(\lambda_1) & LS_R(\lambda_2) & \cdots & LS_R(\lambda_n) \\ LS_G(\lambda_1) & LS_G(\lambda_2) & \cdots & LS_G(\lambda_n) \\ LS_B(\lambda_1) & LS_B(\lambda_2) & \cdots & LS_B(\lambda_n) \end{pmatrix} \cdot \quad (13)$$

$$\begin{pmatrix} P_{(1,\lambda 1)} & P_{(2,\lambda 1)} & P_{(3,\lambda 1)} \\ P_{(1,\lambda 2)} & P_{(2,\lambda 2)} & P_{(3,\lambda 2)} \\ \vdots & \vdots & \vdots \\ P_{1,\lambda n)} & P_{2,\lambda n)} & P_{(3,\lambda n)} \end{pmatrix} \cdot \begin{pmatrix} W_1 \\ W_2 \\ W_3 \end{pmatrix}$$

In this case, an matrix operation section 64 shown in FIG. 13 multiplies the 3-row/n-column spectral characteristics $LS_i(\lambda)$ by the n-row/3-column principal component vectors $P(L, \lambda)$ (L=1–3) and passes a resulting 3-row/3-column vector K to a reflectance calculating section 65.

First, the reflectance calculating section 65 shown in FIG. 13 substitutes the matrix K that are received from the matrix operation section 64 into the right side of Equation (13), substitutes, one by one, color signals ($R_j$, $G_j$, $B_j$) that are received from a grid data calculating section 37 into the left side of Equation (13), and solves, for the weights $W_1$, $W_2$, and $W_3$, simultaneous equation obtained for the respective color signals.

Then, the reflectance calculating section 65 calculates spectral reflectance data Ref$_j(\lambda)$ corresponding to each color signal by substituting weights $W_{j1}$, $W_{j2}$, and $W_{j3}$ that have been obtained for the color signal into Equation (11) and multiplying the principal component vectors $P_L(\lambda)$ by the respective weights $W_{j1}$, $Wj_{j2}$, and $W_{j3}$.

The functions of the weight calculating unit and the component base reflectance calculating unit that were described in the principles can be realized in such a manner that the matrix operation section 64 and the reflectance calculating section 65 operate, in the above described manner, receiving the principal component vectors and the inferred spectral characteristics of the scanner 17.

Using, as described above, principal component vectors obtained by the singular value analyzing section 56 makes it possible to infer, by simple matrix operations, spectral reflectance data that should be determined for a virtual color sample corresponding to each color signal.

The N spectral reflectance data thus obtained are input to a reflectance correcting section 44, where they are subjected to the same correction processing as in the first embodiment. In this manner, the reflectance correcting section 44 realizes the function of the reflectance correcting unit that was described in the principles. Spectral reflectance data of the virtual color sample can be obtained as realistic values (step S39 in FIG. 11).

As a matter of fact, as shown in Table 1, a color difference $\Delta E_2$ between chromaticity coordinates $P_2$ calculated based on corrected estimated reflectance data that have been subjected to the above-described correction and chromaticity coordinates $P_0$ calculated based on the measured reflectance data shown in FIG. 9A is much smaller than a color difference $\Delta E_1$ between chromaticity coordinates $P_1$ obtained when the estimated reflectance data shown in FIG. 9A are used as they are for the chromaticity coordinate calculation and the chromaticity coordinates $P_0$.

TABLE 1

|  | L* | a* | b* | Color difference $\Delta E$ from $P_0$ |
|---|---|---|---|---|
| Color coordinates $P_0$ calculated based on measured values | 40.12 | 57.96 | 49.33 |  |
| Color coordinates $P_1$ calculated based on inferred values (not corrected) | 41.43 | 56.58 | 71.68 | 22.43 |
| Color coordinates $P_2$ calculated based on inferred values (corrected) | 41.74 | 56.20 | 47.67 | 2.91 |

Therefore, it can be said that the correction by the reflectance correcting section 44 can greatly increase the accuracy of inferring spectral reflectance data of a virtual color sample.

Further, this makes it possible to infer, with high accuracy, chromaticity coordinates corresponding to each color signal obtained by the grid data calculating section 37.

Therefore, a highly accurate profile can be obtained by a chromaticity coordinate calculating section 39's calculating sets of chromaticity coordinates corresponding to the respective virtual color samples based on such spectral reflectance data and storing the calculated sets of chromaticity coordinates in profile storing section 28 in such a manner that they are correlated with the respective color signals (step S40 in FIG. 11).

[Embodiment 3]

Figure 14:
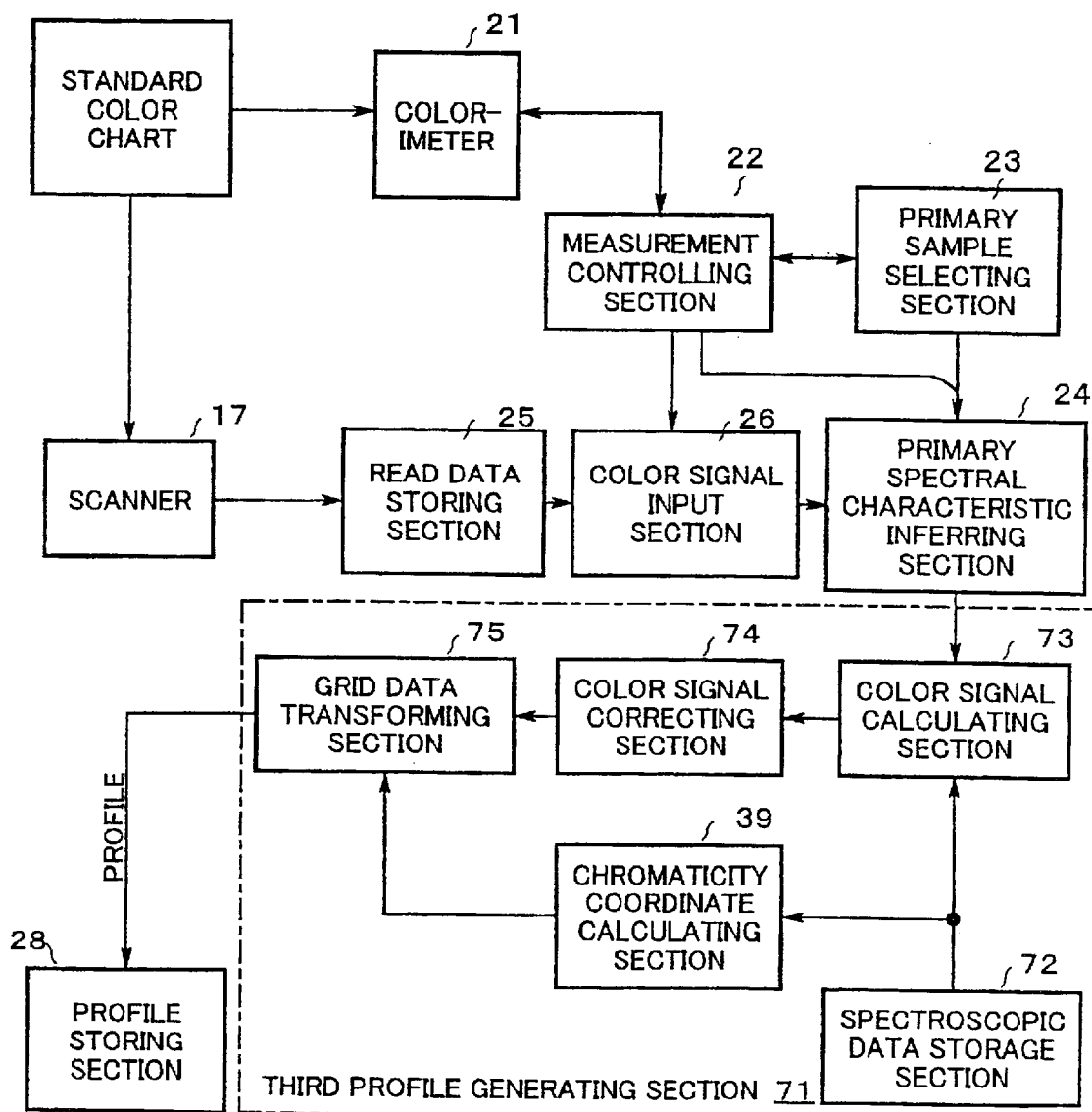
FIG. 14 is a block diagram showing a color coordinate transformation table generation apparatus according to a third embodiment of the invention.
Figure 15:
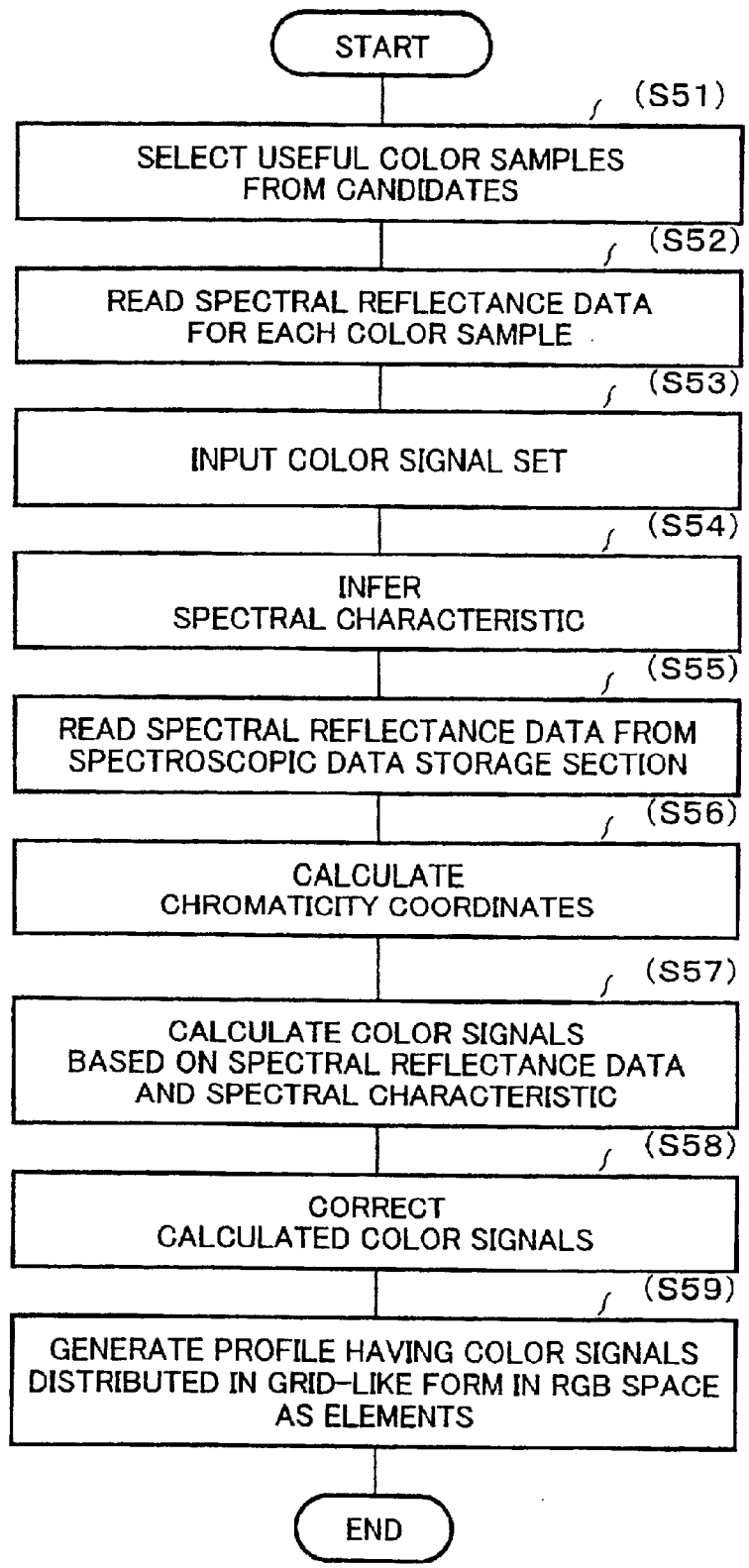
FIG. 15 is a flowchart showing how the color coordinate transformation table generation apparatus of FIG. 14 operates.

FIG. 14 shows a color coordinate transformation table generation apparatus according to a third embodiment of the invention. FIG. 15 is a flowchart showing how the color coordinate transformation table generation apparatus of FIG. 14 operates.

The color coordinate transformation table generation apparatus of FIG. 14 is different from that of the first embodiment in that the former is equipped with a third profile generating section 71 in place of the primary profile generation section 27 of the latter.

Therefore, color samples are selected by the primary sample selecting section 23 and the measurement controlling section 22 (step S51 in FIG. 15) in the same manner as done in steps S11–S13 in FIG. 4, and spectral reflectance data corresponding to each of the selected color samples are input to the primary spectral characteristic inferring section 24 (step S52 in FIG. 15).

The measurement controlling section 22 and the color signal input section 26 operate based on the above selection result, whereby corresponding color signals are selectively input to the primary spectral characteristic inferring section 24 (step S53 in FIG. 15).

Receiving the above data and signals, the primary spectral characteristic inferring section 24 infers spectral characteristics of the scanner 17 (step S54 in FIG. 15) to input obtained inference results to the third profile generating section 71.

Figure 16:
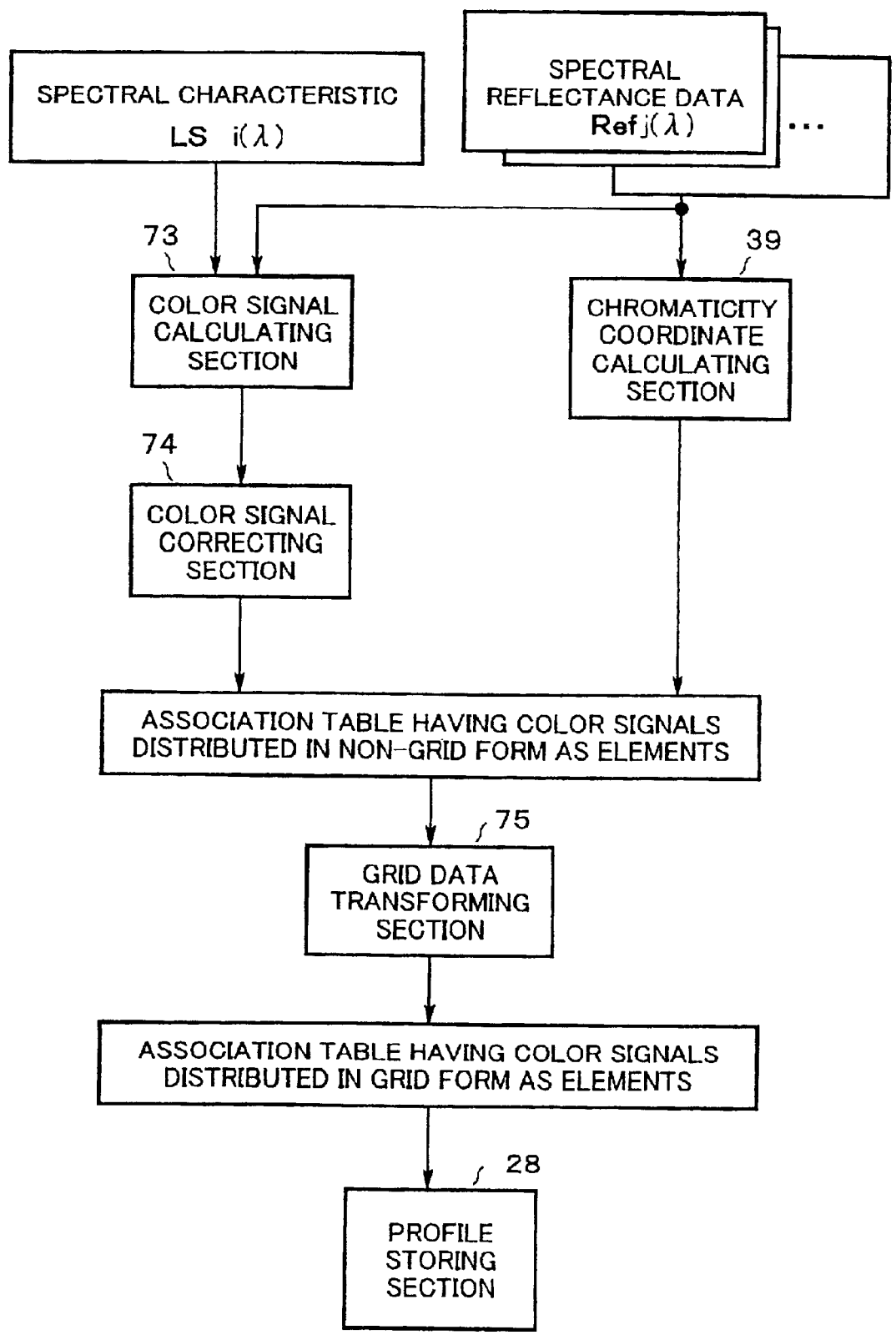
FIG. 16 is a block diagram illustrating an operation of making a color coordinate transformation table.
Figure 17:
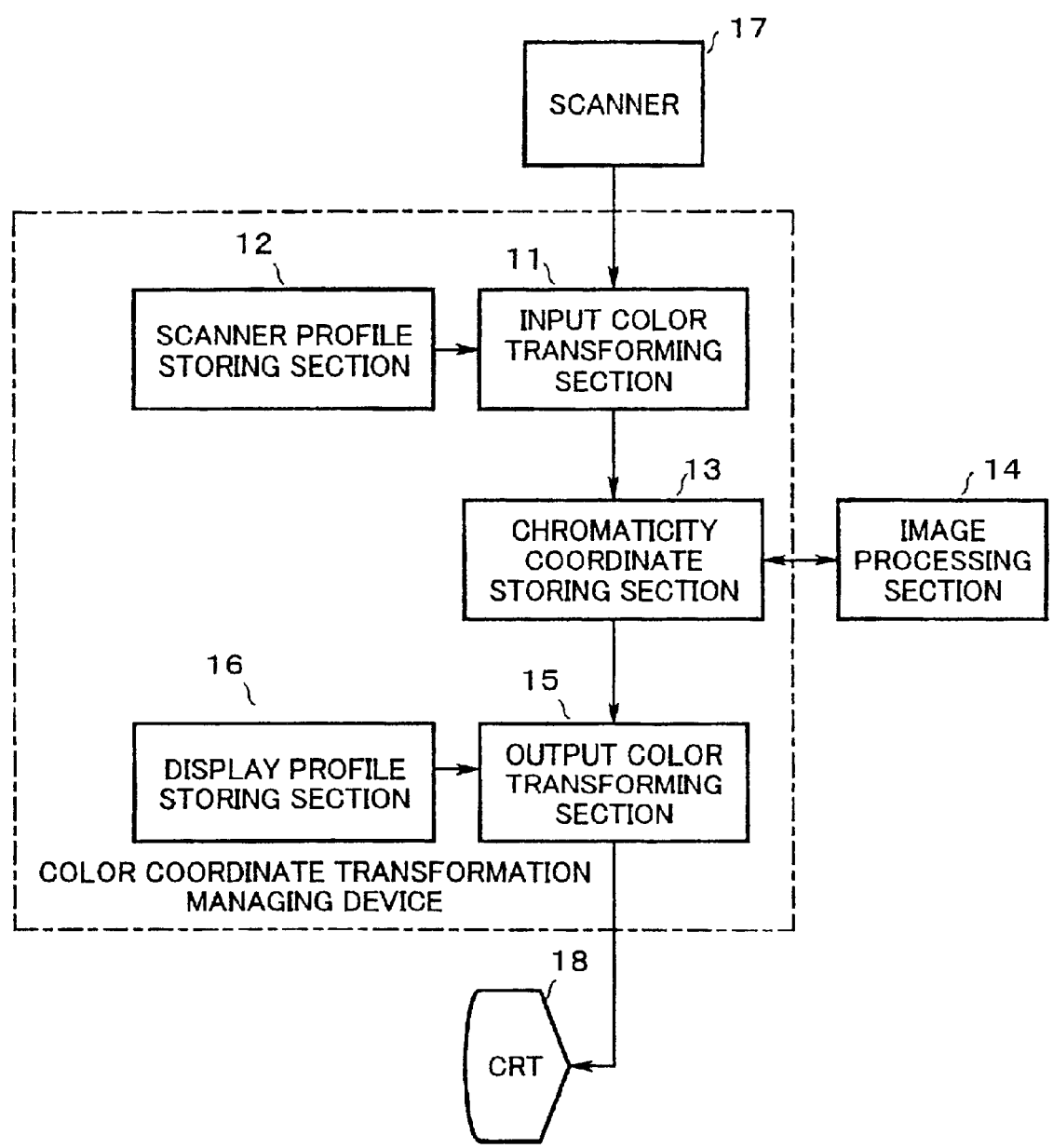
FIG. 17 is a block diagram showing the configuration of an exemplary conventional color coordinate transformation managing device.

FIG. 16 shows how the third profile generating section 71 operates.

In the third profile generating section 71 shown in FIG. 14, a spectroscopic data storage section 72 corresponds to the reflectance accepting unit that was described in the principles. The spectroscopic data storage section 72 contains sets of spectral reflectance data $\text{Refs}_j(\lambda)$ (j=1–M, $\lambda=\lambda_1-\lambda_n$) that were obtained by measuring M different color samples with the colorimeter 21. The spectroscopic data storage section 72 inputs, set by set, the sets of spectral reflectance data $\text{Refs}_j(\lambda)$ to a color signal calculating section 73 and a chromaticity coordinate calculating section 39 (step S55 in FIG. 15).

Receiving the sets of spectral reflectance data $\text{Refs}_j(\lambda)$, the chromaticity coordinate calculating section 39 calculates sets of chromaticity coordinates ($L^*_j$, $a^*_j$, $b^*_j$) indicating colors of the respective color samples (step S56 in FIG. 15; also see FIG. 16), whereby the chromaticity coordinate calculating unit that was described in the principles is realized. The calculated sets of chromaticity coordinates are input to a grid data transforming section 75.

On the other hand, the color signal calculating section 73 shown in FIG. 14 corresponds to the color signal calculating unit that was described in the principles. The color signal calculating section 73 substitutes, into Equation (12), the spectral reflectance data $\text{Refs}_j(\lambda)$ received from the spectroscopic data storage section 72 and spectral characteristics $LS_1(\lambda)$ received from the primary spectral characteristic inferring section 24, to thereby calculate color signals ($R_j$, $G_j$, $B_j$) (j=1–M) that should be obtained when the corresponding color samples are read by the scanner 17 (step S57 in FIG. 15; also see FIG. 16).

There is a possibility that the M color signals calculated by the color signal calculating section 73 includes a signal whose component has a negative-value portion.

It is considered that the reason why such a negative-value portion occurs is that true values of the component are very small and hence errors in inferring spectral characteristics of the scanner 17, measurement errors in measuring spectral reflectance data, etc. appear. The components of a color signal indicating an arbitrary color in the RGB space should have positive values.

In view of the above, a color signal correcting section 74 shown in FIG. 14 corrects the received color signals ($R_j$, $G_j$, $B_j$) so that negative values are replaced by zero, whereby the color signal correcting section 74 realizes the function of the color signal correcting unit that was described in the principles. The values of the color signals calculated based on the corresponding spectral reflectance data $\text{Refs}_j(\lambda)$ and the spectral characteristics $LS_1(\lambda)$ are corrected properly (step S58 in FIG. 15; also see FIG. 16) and realistic color signals can be obtained.

In the above-described manner, an association table of M pairs of color signals and chromaticity coordinates is derived based on the M sets of spectral reflectance data stored in the spectroscopic data storage section 72. The obtained association table can be used, as a base of a profile to be generated, for processing in the grid data transforming section 75 (see FIG. 16).

The information based on which such an association table is derived is the spectral reflectance data $\text{Refs}_j(\lambda)$ stored in the spectroscopic data storage section 72 and the inferred spectral characteristics $LS_1(\lambda)$. Therefore, it is not necessary to measure an actual color chart with the scanner 17 and the colorimeter 21 for deriving the association table of M pairs.

The spectral reflectance data stored in the spectroscopic data storage section 72 can be used any number of times in operations of generating profiles for the scanner 17. Further, the spectral reflectance data can also be used in a similar manner in generating a profile for another color reading device.

If a sufficiently large number of sets of spectral reflectance data are stored in the spectroscopic data storage section 72, an association table of a sufficiently large number of pairs can be obtained by steps S55–S57 in FIG. 15.

Since spectral reflectance data and color signals that have been obtained for selected color samples are used in a process of inferring spectral characteristics of the scanner 17 and the singular value decomposition method is used in this process, spectral characteristics of the scanner 17 can be inferred with high accuracy. Therefore, it is expected that an association table of color signals and sets of chromaticity coordinates that has been derived based on those spectral characteristics of the scanner 17 will be at the same accuracy level as that as would be obtained based on measured values.

Therefore, it is appropriate that the grid data transforming section 75 corresponding to the relationship determining unit that was described in the principles calculate color signals that are distributed in a regular grid form in the RGB color space and sets of chromaticity coordinates corresponding the respective color signals using, as a base, the association table derived based on the stored spectral reflectance data according to, for example, a technique disclosed in Japanese Patent Application No. 262564/1997 (step S59 in FIG. 15), and store those in the profile storing section 28 (see FIG. 16).

In the above-described manner, the color coordinate transformation table generation apparatus according to this embodiment can generate a highly accurate profile.

As described above, according to the color coordinate transformation table generation apparatus of the invention, spectral characteristics of a color reading device can be inferred with high accuracy based on sets of spectral reflectance data obtained by measuring on a very small number of color samples and color signals obtained by reading those color samples with the color reading device as a subject of evaluation. Further, a color coordinate transformation table corresponding to color signals scattered in a desired distribution in a color space that depends on the color reading device can be generated.

In view of the fact that in the prior art a manual operation of measuring color samples accounts for a large part of an operation of generating a profile for a color reading device such as a scanner, the usefulness of the color coordinate transformation table generation apparatus according to the invention, that is, the reduction in the number of color samples as subjects of measurement, is apparent.

It is expected that the usefulness of samples that were selected at the beginning does not vary at least for a color reading device as a subject of evaluation. Therefore, in generating a color coordinate transformation table again for the same color reading device, the step of selecting usable color samples can be omitted and the previously selected sample set can be used as it is.

This is very advantageous in, for example, generating a color coordinate transformation table every predetermined period for the same color reading device to, for example, evaluate aging of performance of the color reading device.

The invention is not limited to the above embodiments and various modifications may be made without departing from the spirit and the scope of the invention. Any improvement may be made in part or all of the components.

What is claimed is:

1. A color coordinate transformation table generation method comprising the steps of:

selecting, from a sufficiently large number of color samples, a plurality of color samples suitable for inferring spectral characteristics of a color reading device as a subject of evaluation;

obtaining sets of spectral reflectance data by measuring each of the selected color samples at predetermined wavelength intervals;

accepting color signals representing colors of the respective selected color samples in a device-dependent color space from the color reading device as a subject of evaluation;

inferring spectral characteristics of the color reading device when the color reading device reads a color of an original based on the sets of spectral reflectance data and the accepted color signals; and generating, according to the inferred spectral characteristics, a color coordinate transformation table indicating a relationship between color signals distributed in the device-dependent color space and sets of chromaticity coordinates indicating, in another color space, true colors to be represented by the color signals, respectively.

2. A color coordinate transformation table generation apparatus comprising:

a selecting unit for selecting, from a sufficiently large number of color samples, a sample set consisting of a plurality of color samples suitable for inferring spectral characteristics of a color reading device as a subject of evaluation;

a measuring unit for obtaining sets of spectral reflectance data by measuring each of the selected color samples constituting the sample set at predetermined wavelength intervals;

an accepting unit for accepting color signals representing colors of the respective selected color samples constituting the sample set in a device-dependent color space from the color reading device as a subject of evaluation;

an inferring unit for inferring spectral characteristics of the color reading device when the color reading device reads a color of an original based on the sets of spectral reflectance data and the accepted color signals; and a table generating unit for generating, according to the inferred spectral characteristics, a color coordinate transformation table indicating a relationship between color signals distributed in the device-dependent color space and sets of chromaticity coordinates indicating, in another color space, true colors to be represented by the color signals, respectively.

3. The color coordinate transformation table generation apparatus according to claim 2, wherein the selecting unit comprises:

a simple extracting unit for extracting a plurality of color samples from the sufficiently large number of color samples;

an evaluation index calculating unit for calculating, for a sample set consisting of the extracted color samples, an evaluation index indicating mutual independence of components which correspond to respective values of each spectral characteristic to be inferred;

an output unit for outputting the sample set as a selection result when the evaluation index indicates that the color samples constituting the sample set are sufficiently independent; and a repeat unit for instructing the simple extracting unit to extract a new sample set when the evaluation index indicates that the color samples constituting the sample are not sufficiently independent.

4. The color coordinate transformation table generation apparatus according to claim 2, wherein the selecting unit comprises:

a hue evaluating unit for evaluating hue of each of the sufficiently large number of color samples; and a hue base extracting unit for extracting color samples whose evaluation values of hue are distributed uniformly, based on evaluation results from the hue evaluating unit.

5. The color coordinate transformation table generation apparatus according to claim 2, wherein the selecting unit comprises:

a saturation evaluating unit for evaluating saturation of each of the sufficiently large number of color samples; and a saturation base extracting unit for extracting color samples whose saturation has been judged high by the saturation evaluating unit.

6. The color coordinate transformation table generation apparatus according to claim 2, wherein the inferring unit comprises:

an equation generating unit for generating simultaneous equations that relate a color signal to a set of spectral reflectance data of a color sample corresponding to the color signal;

a transforming unit for transforming the simultaneous-equations using a model that expresses each spectral characteristic by a linear combination of a plurality of primary spline functions; and a weight analysis unit for determining spectral characteristics by analyzing the transformed simultaneous equations and calculating weights for the respective spline functions.

7. The color coordinate transformation table generation apparatus according to claim 2, wherein the inferring unit comprises:

an equation generating unit for generating simultaneous equations that relate a color signal to a set of spectral reflectance data of a color sample corresponding to the color signal;

a singular value analyzing unit for calculating weights corresponding to respective proper principal component vectors by performing a singular value analysis on the simultaneous equations; and a characteristic calculating unit for calculating spectral characteristics based on the calculated weights and the principal component vectors.

8. The color coordinate transformation table generation apparatus according to claim 2, wherein the inferring unit comprises:

an equation generating unit for generating simultaneous equations that relate a color signal to a set of spectral reflectance data of a color sample corresponding to the color signal;

a singular value analyzing unit for calculating weights corresponding to respective proper principal component vectors by performing a singular value analysis on the simultaneous equations;

a vector selecting unit for selecting only useful principal component vectors based on the weights calculated by the singular value analyzing unit; and a characteristic calculating unit for calculating spectral characteristics based on the selected useful principal component vectors and weights corresponding thereto.

9. The color coordinate transformation table generation apparatus according to claim 2, wherein the table generating unit comprises:

a color signal generating unit for generating, as elements of a color coordinate transformation table, color signals to be scattered in a desired distribution in the device-dependent color space;

a sample preparing unit for calculating, for each of the generated color signals, sets of spectral reflectance data corresponding to virtual color samples which are to provide the generated color signals respectively, by using the spectral characteristics inferred by the inferring unit; and a chromaticity calculating unit for calculating, as elements of the color coordinate transformation table, sets of chromaticity coordinates in a desired color space from the sets of spectral reflectance data corresponding to the respective virtual color samples.

10. The color coordinate transformation table generation apparatus according to claim 2, wherein the table generating unit comprises:

a color signal generating unit for generating, as elements of a color coordinate transformation table, color signals to be scattered in a desired distribution in the device-dependent color space;

a sample preparing unit for calculating, for each of the generated color signals, sets of spectral reflectance data corresponding to virtual color samples which are to provide the generated color signals respectively, by using the spectral characteristics inferred by the inferring unit, the sample preparing unit comprising a principal component accepting unit for accepting principal component vectors that determine a set of spectral reflectance data of an arbitrary color sample, a weight calculating unit for calculating, based on the accepted principal component vectors and the spectral characteristics, weights to be applied to the principal component vectors in order to provide sets of spectral reflectance data of the virtual color samples corresponding to the respective color signals scattered in the predetermined distribution, a component base reflectance calculating unit for calculating sets of spectral reflectance data of the respective virtual color samples based on the calculated weights and the principal component vectors, and a reflectance correcting unit for correcting negative values included in the calculated sets of spectral reflectance data to zero; and a chromaticity calculating unit for calculating, as elements of the color coordinate transformation table, sets of chromaticity coordinates in a desired color space from the sets of spectral reflectance data corresponding to the respective virtual color samples.

11. The color coordinate transformation table generation apparatus according to claim 2, wherein the table generating unit comprises:

a color signal generating unit for generating, as elements of a color coordinate transformation table, color signals to be scattered in a desired distribution in the device-dependent color space;

a sample preparing unit for calculating, for each of the generated color signals, sets of spectral reflectance data corresponding to virtual color samples which are to provide each generated color signals, by using the spectral characteristics inferred by the inferring unit, the sample preparing unit comprising:

a model generating unit for generating a model equation that relates an arbitrary color signal to a set of spectral reflectance data of a virtual color sample which is to provide the arbitrary color signal;

an inverse calculating unit for calculating a pseudo-inverse of a matrix representing the spectral characteristics of the color reading device in the model equation;

a model base reflectance calculating unit for calculating sets of spectral reflectance data of the respective virtual color samples based on the color signals scattered in the desired distribution and the calculated pseudo-inverse; and a reflectance correcting unit for correcting negative values included in the calculated sets of spectral reflectance data to zero; and a chromaticity calculating unit for calculating, as elements of the color coordinate transformation table, sets of chromaticity coordinates in a desired color space from the sets of spectral reflectance data corresponding to the respective virtual color samples.

12. The color coordinate transformation table generation apparatus according to claim 2, wherein the table generating unit comprises:

a reflectance accepting unit for accepting sets of spectral reflectance data of a sufficiently large number of color samples having different colors;

a color signal calculating unit for calculating color signals as expected input data of the color reading device based on the sets of spectral reflectance data and the spectral characteristics inferred by the inferring unit;

a color signal correcting unit for correcting negative values of the calculated color signals to zero;

a chromaticity coordinate calculating unit for calculating sets of chromaticity coordinates in a desired color space, the chromaticity coordinates corresponding to the respective sets of spectral reflectance data; and a relationship determining unit for determining relationships between color signals scattered in the desired distribution in the device-dependent color space and sets of chromaticity coordinates indicating, in the desired color space, true colors expected to be represented by the color signals, respectively, based on relationships between the calculated sets of chromaticity coordinates and the corrected color signals.

13. A storage medium on which a program is recorded, the program causing a computer to execute:

a selecting step of selecting, from a sufficiently large number of color samples, a sample set consisting of a plurality of color samples suitable for inferring spectral characteristics of a color reading device as a subject of evaluation;

a measuring step of obtaining sets of spectral reflectance data by measuring each of the selected color samples constituting the sample set at predetermined wavelength intervals;

an accepting step of accepting color signals representing colors of the respective selected color samples constituting the sample set in a device-dependent color space from the color reading device as a subject of evaluation;

an inferring step of inferring spectral characteristics of the color reading device when the color reading device reads a color of an original based on the sets of spectral reflectance data and the accepted color signals; and a table generating step of generating, according to the inferred spectral characteristics, a color coordinate transformation table indicating a relationship between color signals distributed in the device-dependent color space and sets of chromaticity coordinates indicating, in another color space, true colors expected to be represented by the color signals, respectively.

* * * * *